United States Patent
Yuan et al.

(10) Patent No.: US 12,518,430 B2
(45) Date of Patent: Jan. 6, 2026

(54) POINT CLOUD ENCODING AND DECODING METHOD AND DECODER

(71) Applicant: GUANGDONG OPPO MOBILE TELECOMMUNICATIONS CORP., LTD., Guangdong (CN)

(72) Inventors: Hui Yuan, Guangdong (CN); Lu Wang, Guangdong (CN); Ming Li, Guangdong (CN); Xiaohui Wang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 315 days.

(21) Appl. No.: 18/482,410

(22) Filed: Oct. 6, 2023

(65) Prior Publication Data
US 2024/0037801 A1    Feb. 1, 2024

Related U.S. Application Data

(63) Continuation of application No. PCT/CN2021/087076, filed on Apr. 13, 2021.

(51) Int. Cl.
G06T 9/00    (2006.01)

(52) U.S. Cl.
CPC .................... G06T 9/001 (2013.01)

(58) Field of Classification Search
None
See application file for complete search history.

(56) References Cited

U.S. PATENT DOCUMENTS 11,568,514 B2 *  1/2023  Hur ................. G06T 9/001
11,836,954 B2 * 12/2023  Dai ................. G06T 9/005
(Continued)

FOREIGN PATENT DOCUMENTS

CN    110418135    11/2019
EP    4072145      10/2022
(Continued)

OTHER PUBLICATIONS

Han, "[G-PCC] CE13.19 Report on Attribute Layer Quantization Control," ISO/IEC JTC1/SC29/WG11 MPEG2019/ m49624, Jul. 2019.
(Continued)

*Primary Examiner* — Anand P Bhatnagar
(74) *Attorney, Agent, or Firm* — Hodgson Russ LLP

(57) ABSTRACT

A point cloud encoding method is provided. The method includes the following. A residual value of attribute information of a current point in a point cloud is determined according to a prediction value of the attribute information of the current point. An index of the current point is determined. Lossless encoding is performed on the residual value of the attribute information of the current point, when the index of the current point belongs to an index range of a first point. A quantized residual value of the attribute information of the current point is obtained by quantizing the residual value of the attribute information of the current point based on a quantization weight of the current point and a quantization step size of the current point, when the index of the current point is beyond the index range of the first point, and the quantized residual value is encoded.

20 Claims, 10 Drawing Sheets

(56) References Cited

U.S. PATENT DOCUMENTS

| | | | |
|---|---|---|---|
| 11,882,303 B2* | 1/2024 | Hur | H04N 19/96 |
| 11,956,470 B2* | 4/2024 | Ray | H04N 23/698 |
| 11,979,607 B2* | 5/2024 | Oh | H04N 19/597 |
| 12,219,141 B2* | 2/2025 | Yuan | H04N 19/597 |
| 12,335,520 B2* | 6/2025 | Hur | H04N 19/119 |
| 2021/0103780 A1 | 4/2021 | Mammou et al. | |
| 2021/0104073 A1 | 4/2021 | Yea et al. | |
| 2023/0328246 A1* | 10/2023 | Yuan | H04N 19/136 |
| | | | 375/240.03 |
| 2024/0037801 A1* | 2/2024 | Yuan | H04N 19/12 |
| 2024/0121418 A1* | 4/2024 | Hur | H04N 21/2393 |
| 2025/0024041 A1* | 1/2025 | Yang | H04N 19/96 |
| 2025/0113032 A1* | 4/2025 | Yuan | H04N 19/597 |

FOREIGN PATENT DOCUMENTS

| | | |
|---|---|---|
| WO | 2020100866 | 5/2020 |
| WO | 2020256244 | 12/2020 |
| WO | 2021049758 | 3/2021 |

OTHER PUBLICATIONS

EPO, Extended European Search Report for EP Application No. 21936365.2, Dec. 16, 2024.

WIPO, International Search Report and Written Opinion for International Application No. PCT/CN2021/087076, Jan. 14, 2022.

* cited by examiner

POINT CLOUD ENCODING AND DECODING METHOD AND DECODER

CROSS-REFERENCE TO RELATED APPLICATION(S)

This application is a continuation of International Application No. PCT/CN2021/087076, filed Apr. 13, 2021, the entire disclosure of which is incorporated herein by reference.

TECHNICAL FIELD

Embodiments of the disclosure relate to the field of point cloud encoding and decoding technology, in particular to a point cloud encoding and decoding method and a decoder.

BACKGROUND

A surface of an object is collected by a collecting device to form point cloud data, where the point cloud data includes hundreds of thousands or even more points. In a video production process, the point cloud data is transmitted between an encoding device and a decoding device in the form of a point cloud media file. However, such a huge number of points brings a challenge to transmission, and thus the point cloud encoding device needs to compress the point cloud data for transmission. In geometry-based point cloud compression (G-PCC) encoder framework, after the input point cloud is partitioned into slices, each slice will be encoded independently, and for each slice, the geometry information of the points and the attribute information corresponding to each point are encoded separately.

The compression of the point cloud data mainly includes the compression of geometry information and the compression of attribute information. In the compression of attribute information, redundant information in the point cloud data is reduced or eliminated through prediction. For example, one or more neighbouring points of a current point are obtained from encoded points, and attribute information of the current point is predicted according to attribute information of the neighbouring points.

However, at present, point cloud prediction is inaccurate, which in turn reduces the effect of point cloud encoding and decoding.

SUMMARY

In a first aspect, embodiments of the disclosure provide a point cloud encoding method. The method includes the following. A residual value of attribute information of a current point in a point cloud is determined according to a prediction value of the attribute information of the current point. An index of the current point is determined. Lossless encoding is performed on the residual value of the attribute information of the current point, when the index of the current point belongs to an index range of a first point, where the first point is at least one point on which lossless encoding is performed. A quantized residual value of the attribute information of the current point is obtained by quantizing the residual value of the attribute information of the current point based on a quantization weight of the current point and a quantization step size of the current point, when the index of the current point is beyond the index range of the first point, and a bitstream is obtained by encoding the quantized residual value, where the quantization weight of the current point is a weight used when weighting the residual value of the current point.

In a second aspect, embodiments of the disclosure provide a point cloud decoding method. The method includes the following. A bitstream is decoded, to determine prediction values of points in a point cloud and residual information of attribute information of a current point in the point cloud. An index of the current point is determined. Determine that the residual information is a residual value of the current point when the index of the current point belongs to an index range of a first point, and a reconstructed value of the current point is determined based on the residual value and a prediction value of the current point, where the first point is at least one point on which lossless encoding is performed. Determine that the residual information is a quantized residual value of the current point when the index of the current point is beyond the index range of the first point, a reconstructed residual value of the attribute information of the current point is obtained by performing inverse quantization on the quantized residual value based on a quantization weight of the current point and a quantization step size of the current point, and the reconstructed value of the attribute information of the current point is obtained according to the reconstructed residual value and the prediction value of the attribute information of the current point, where the quantization weight of the current point is a weight used when weighting the residual value of the current point.

In a third aspect, embodiments of the disclosure provide a decoder. The decoder includes at least one processor and a memory. The memory is coupled to the at least one processor and stores at least one computer executable instruction thereon. When executed by the at least one processor, the at least one computer executable instruction causes the at least one processor to execute the method of the second aspect.

DETAILED DESCRIPTION

Figure 1:
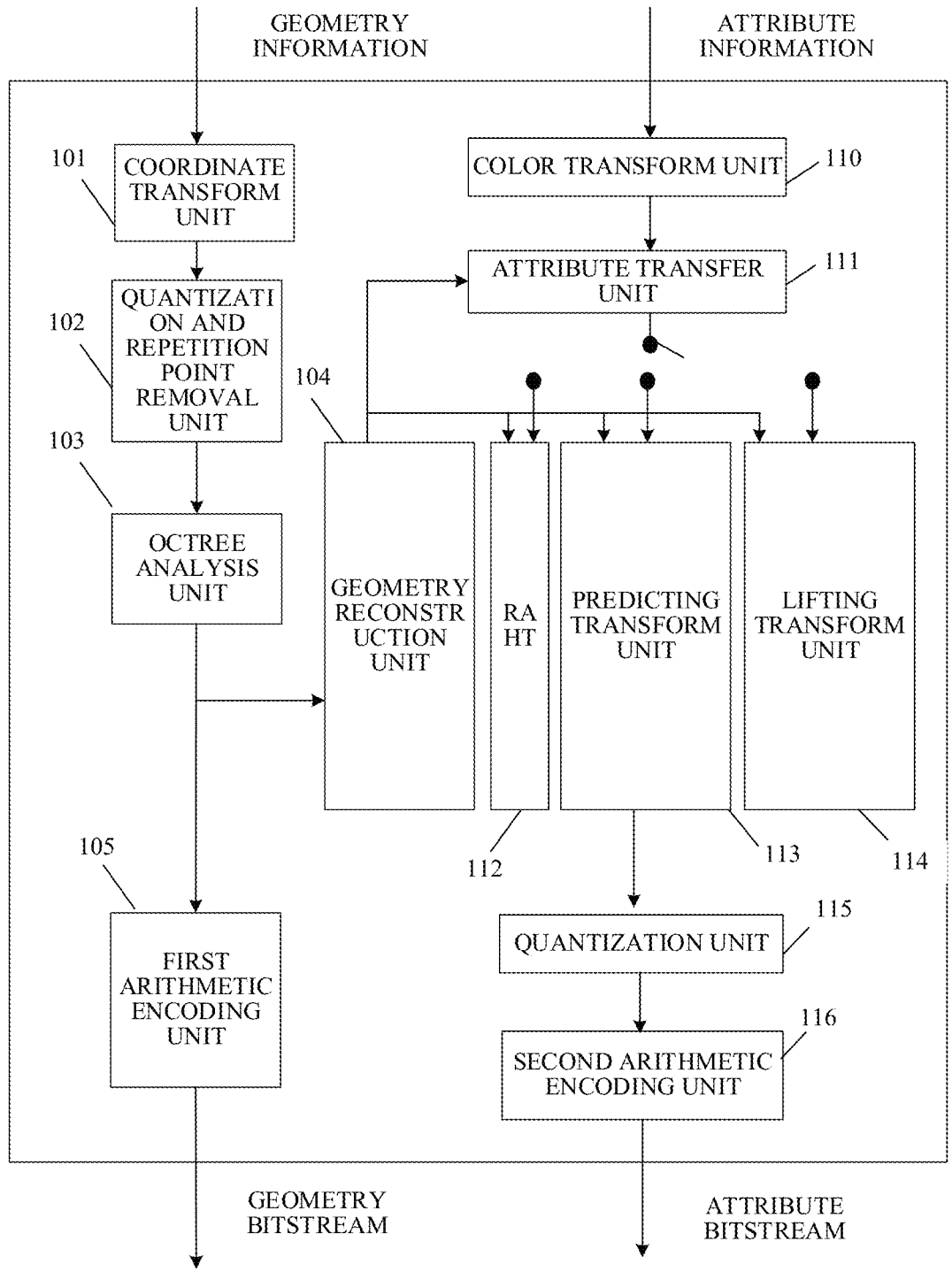
FIG. 1 is a schematic block diagram of an encoding system provided in embodiments of the disclosure.

To have a more detailed understanding of features and technical contents of the embodiments of the disclosure, the embodiments of the disclosure will be described in detail below in conjunction with accompanying drawings, which are merely for reference and are not intended to limit the embodiments of the disclosure.

To facilitate the understanding of embodiments of the disclosure, relevant concepts involved in the embodiments of the disclosure are briefly introduced as follows.

The point cloud is a set of discrete points irregularly distributed in space that express a spatial structure and surface attribute of a three-dimensional (3D) object or a 3D scene.

The point cloud data is a specific recording form of the point cloud. Each point in the point cloud can include position information of the point and attribute information of the point. The position information of the point refers to 3D coordinate information of the point. The position information of the point can be called geometry information of the point. For example, the attribute information of the point can include color information and/or reflectance. For example, the color information can be any kind of information on the color space. In an example, the color information can be red green blue (RGB). In another example, the color information can be luma-chroma (YCbCr, YUV) information. For example, Y denotes luma, Cb (U) denotes blue chroma, Cr (V) denotes red chroma, U and V each denote chroma, which is used to describe color difference information. In an example, a point in a point cloud obtained according to a laser measurement principle may include three-dimensional coordinate information of the point and laser reflectance of the point. In another example, a point in a point cloud obtained according to a photographic measurement principle may include three-dimensional coordinate information of the point and color information of the point. In still another example, a point in a point cloud obtained according to a combination of the laser measurement principle and the photographic measurement principle may include the three-dimensional coordinate information of the point, the laser reflectance of the point, and the color information of the point.

The way to obtain the point cloud data includes, but is not limited to at least one of the following. (1) The point cloud data is obtained through computer device generation. A computer device may generate point cloud data of a virtual three-dimensional object and scene. (2) The point cloud data is obtained through 3D laser scanning. Through 3D laser scanning, point cloud data of a static real-world three-dimensional object or scene may be obtained, and the point cloud data in million level may be obtained per second. (3) The point cloud data is obtained through 3D photographic measurement. Point cloud data of a real-world visual scene is obtained by collecting the real-world visual scene through a 3D photographic device (i.e., a group of cameras or a camera device with multiple lenses and sensors), and point cloud data of a dynamic real-world three-dimensional object or scene can be obtained through 3D photography. (4) The point cloud data of biological tissue organs may be obtained through a medical apparatus. In the medical field, the point cloud data of the biological tissue organs may be obtained through the medical apparatus such as magnetic resonance imaging (MM), computed tomography (CT), and electromagnetic localization information.

According to the acquisition way, the point cloud may include: a dense point cloud and a sparse point cloud.

According to the timing type of the data, the point cloud may include a first type of static point cloud, a second type of dynamic point cloud, and a third type of dynamically-acquired point cloud.

For the first type of static point cloud, the object is stationary, and the device for acquiring the point cloud is also stationary.

For the second type of dynamic point cloud, the object is moving, but the device for acquiring the point cloud is stationary.

For the third type of dynamically-acquired point cloud, the device for acquiring the point cloud is moving.

According to the purpose, the point cloud includes two types.

Type 1: machine-perceived point cloud, for autonomous navigation system, real-time inspection system, geographic information system, visual sorting robot, rescue and disaster relief robot, and other point cloud embodiment scenes.

Type 2: human-eye-perceived point cloud, for digital cultural heritage, free viewpoint broadcasting, three-dimensional immersion communication, three-dimensional immersion interaction, and other point cloud embodiment scenes.

The point cloud data may be used to form the point cloud media, and the point cloud media may be a media file. The point cloud media may include multiple media frames, and each media framework in the point cloud media consists of point cloud data. The point cloud media is widely used as it can express a spatial structure and surface attribute of a three-dimensional object or a three-dimensional scene in a flexible and convenient way. After encoding the point cloud media, an encoded bitstream may be encapsulated into an encapsulated file, which may be used for transmission to the user. Accordingly, at a point cloud media player terminal, the encapsulated file may be de-capsulated and is decoded, and finally decoded data flow is presented. The encapsulated file may also be called a point cloud file.

For now, the point cloud may be encoded through a point cloud encoding framework.

The point cloud encoding framework may be a geometry point cloud compression (G-PCC) encoding and decoding framework or a video point cloud compression (V-PCC) encoding and decoding framework provided by the moving picture experts group (MPEG), or may be an AVS-PCC encoding and decoding framework provided by the audio video standard (AVS). The G-PCC encoding and decoding framework may be used for compression for the first static point cloud and the third type of dynamically-acquired point cloud, and the V-PCC encoding and decoding framework may be used for compression for the second type of dynamic point cloud. The G-PCC encoding and decoding framework is also called a point cloud codec TMC13, and the V-PCC encoding and decoding framework is also called a point cloud codec TMC2. An encoding and decoding framework applicable to embodiments of the disclosure is described below in terms of the G-PCC encoding and decoding framework.

FIG. 1 is a schematic block diagram of an encoding framework 100 provided in embodiments of the disclosure.

As illustrated in FIG. 1, the encoding framework 100 can obtain position information (geometry information) and attribute information of a point cloud from an acquisition device. The encoding of the point cloud includes geometry encoding and attribute encoding. In one embodiment, the process of geometry encoding includes: performing preprocessing such as coordinate transformation and quantization and removal of repetition points on the original point cloud, and performing encoding after constructing an octree, to form a geometry bitstream. The process of attribute encoding includes: by giving reconstructed information of position information and actual values of attribute information of the input point cloud, selecting one of three prediction modes for point cloud prediction, quantizing the predicted result, and performing arithmetic encoding, to form an attribute bitstream.

As illustrated in FIG. 1, the position encoding can be achieved with the following units: a coordinate transform unit 101, a quantization and repetition point removal unit 102, an octree analysis unit 103, a geometry reconstruction unit 104, and a first arithmetic encoding unit 105.

The coordinate transform unit 101 can be used to transform world coordinates of points in the point cloud to relative coordinates. For example, the minimum values of coordinate axes x, y, and z are respectively subtracted from geometry coordinates of the point, which is equivalent to a de-direct current operation, to transform coordinates of the point in the point cloud from world coordinates to relative coordinates. The quantization and repetition point removal unit 102 can be used to reduce the number of coordinates through quantization. After quantization, originally different points may be given the same coordinates, and based on this, repetition points may be removed by a de-duplication operation. For example, multiple points with the same quantization position and different attribute information may be merged into one point through attribute transformation. In some embodiments of the disclosure, the quantization and repetition point removal unit 102 is an optional unit module. The octree analysis unit 103 can encode position information of quantized points through octree encoding. For example, the point cloud is partitioned in the form of an octree, so that positions of the points may be in a one-to-one correspondence with points of the octree. Positions of occupied nodes in the octree are determined and flags thereof are set to 1, to perform geometry encoding. The first arithmetic encoding unit 105 can perform arithmetic encoding on the position information output from the octree analysis unit 103 through entropy encoding, i.e., the geometry bitstream is generated through arithmetic encoding by using the position information output from the octree analysis unit 103. The geometry bitstream can also be called a geometry code stream.

The attribute encoding can be achieved with the following units: a color transform unit 110, an attribute transfer unit 111, a region adaptive hierarchical transform (RAHT) unit 112, a predicting transform unit 113, and a lifting transform unit 114, a quantization unit 115, and a second arithmetic encoding unit 116.

The color transform unit 110 can be used to transform an RGB color space of the points in the point cloud to YCbCr format or other formats. The attribute transfer unit 111 can be used to transform the attribute information of the points in the point cloud to minimize attribute distortion. For example, the attribute transfer unit 111 may be used to obtain actual values of the attribute information of the points. For example, the attribute information may be color information of the points. After the actual values of the attribute information of the points are obtained through transformation of the attribute transfer unit 111, any prediction unit can be selected to predict the points in the point cloud. The units for predicting the points in the point cloud may include at least one of: the RAHT unit 112, the predicting transform unit 113, and the lifting transform unit 114. In other words, any of the RAHT unit 112, the predicting transform unit 113, and the lifting transform unit 114 can be used to predict attribute information of a point in the point cloud to obtain a prediction value of the attribute information of the point, and further obtain a residual value of the attribute information of the point based on the prediction value of the attribute information of the point. For example, the residual value of the attribute information of the point may be the actual value of the attribute information of the point minus the prediction value of the attribute information of the point.

The predicting transform unit 113 can also be used to generate a level of detail (LOD), to predict attribute information of points in the LOD sequentially, and to calculate residuals, for subsequent quantization encoding. Specifically, for each point in the LOD, three nearest neighboring points are found in the previous LOD, and then the current point is predicted according to reconstructed values of the three neighboring points to obtain a prediction value; based on this, a residual value of the current point can be obtained based on the prediction value of the current point and an actual value of the current point. For example, the residual value can be determined based on the following formula (1):

$$\text{attrResidualQuant} = (\text{attrValue} - \text{attrPred})/\text{Qstep} \tag{1},$$

where attrResidualQuant represents the residual value of the current point, attrPred represents the prediction value of the current point, attrValue represents the actual value of the current point, and Qstep represents a quantization step size. Qstep is calculated from the quantization parameter (Qp).

The current point will be used as the nearest neighbor of a subsequent point(s), and the reconstructed value of the current point will be used to predict attribute information of the subsequent point. The reconstructed value of the attribute information of the current point can be obtained through the following formula (2):

$$\text{reconstructedColor} = \text{attrResidualQuant} \times \text{Qstep} + \text{attrPred} \tag{2},$$

where reconstructedColor denotes the reconstructed value of the current point, attrResidualQuant denotes the residual value of the current point, Qstep denotes the quantization step size, and attrPred denotes the prediction value of the current point. Qstep is calculated from the quantization parameter (Qp).

The generation process of the LOD includes: obtaining Euclidean distances among the points according to the position information of the points in the point cloud, and partitioning the points into different LOD layers according to the Euclidean distances. In one embodiment, the Euclidean distances can be sorted and then points corresponding to different ranges of Euclidean distances are partitioned into different LOD layers. For example, a point can be randomly selected and classified into a first LOD layer. Then, Euclidean distances between remaining points and the point are calculated, and points whose Euclidean distances satisfy a first threshold are classified into a second LOD layer. The centroid of the points in the second LOD layer is obtained, Euclidean distances between points other than the first LOD layer and second LOD layer and the centroid is calculated, and points whose Euclidean distances satisfy a second threshold are classified into a third LOD layer. The above is continued until all points are classified into LOD layers. The threshold value of the Euclidean distance can be adjusted, so that the number of points in each LOD layer is increasing. It should be understood that, the LOD layer partition can be achieved in other ways, which is not limited in the disclosure. It should be noted that, the point cloud can be directly partitioned into one or more LOD layers, or the point cloud can be first partitioned into multiple point cloud slices, and each point cloud slice can be partitioned into one or more LOD layers. For example, the point cloud can be partitioned into multiple point cloud slices, and the number of points in each point cloud slice can range from 550,000 to 1.1 million. Each point cloud slice can be viewed as a separate point cloud. Each point cloud slice can be partitioned into multiple LOD layers, where each LOD layer includes multiple points. In one embodiment, the LOD layer partition is based on the Euclidean distance among points.

Figure 2:
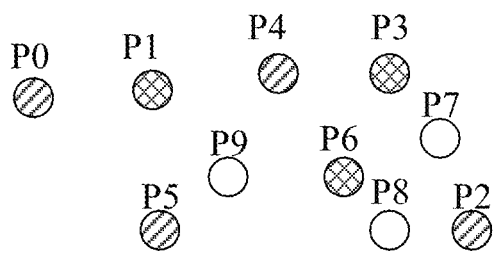
FIG. 2 is schematic diagram 1 of a level of detail (LOD) layer provided in embodiments of the disclosure.

FIG. 2 is a schematic block diagram of an LOD layer provided in embodiments of the disclosure.

As illustrated in FIG. 2, assume that the point cloud includes multiple points arranged in an original order, i.e., P0, P1, P2, P3, P4, P5, P6, P7, P8, and P9, and assume that the point cloud can be partitioned into three LOD layers, i.e., LOD0, LOD1, and LOD2, based on Euclidean distances among points. LOD0 may include P0, P5, P4, and P2, LOD2 may include P1, P6, and P3, and LOD3 may include P9, P8, and P7. In this case, LOD0, LOD1, and LOD2 can be used to form an LOD-based order of the point cloud, i.e., P0, P5, P4, P2, P1, P6, P3, P9, P8, and P7. The LOD-based order can be used as an encoding order of the point cloud.

The quantization unit 115 may be used to quantize the residual values of the attribute information of the points. For example, if the quantization unit 115 is connected with the predicting transform unit 113, the quantization unit may be used to quantize a residual value of attribute information of a point output from the predicting transform unit 113. For example, the residual value of the attribute information of the point output from the predicting transform unit 113 is quantized by using the quantization step size, to improve system performance. The second arithmetic encoding unit 116 may perform entropy encoding on the residual value of the attribute information of the point using zero run length coding, to obtain the attribute bitstream. The attribute bitstream may be bitstream information.

It should be understood that, in embodiments of the disclosure, the prediction value (or called predicted value) of the attribute information of the point in the point cloud may also be called the predicted color in the LOD mode. The actual value of the attribute information of the point minus the prediction value of the attribute information of the point is the residual value of the point. The residual value of the attribute information of the point can also be called the residual color in the LOD mode. The prediction value of the attribute information of the point and the residual value of the attribute information of the point are added to obtain the reconstructed value of the attribute information of the point. The reconstructed value of the attribute information of the point can also be called the reconstructed color in the LOD mode.

Figure 3:
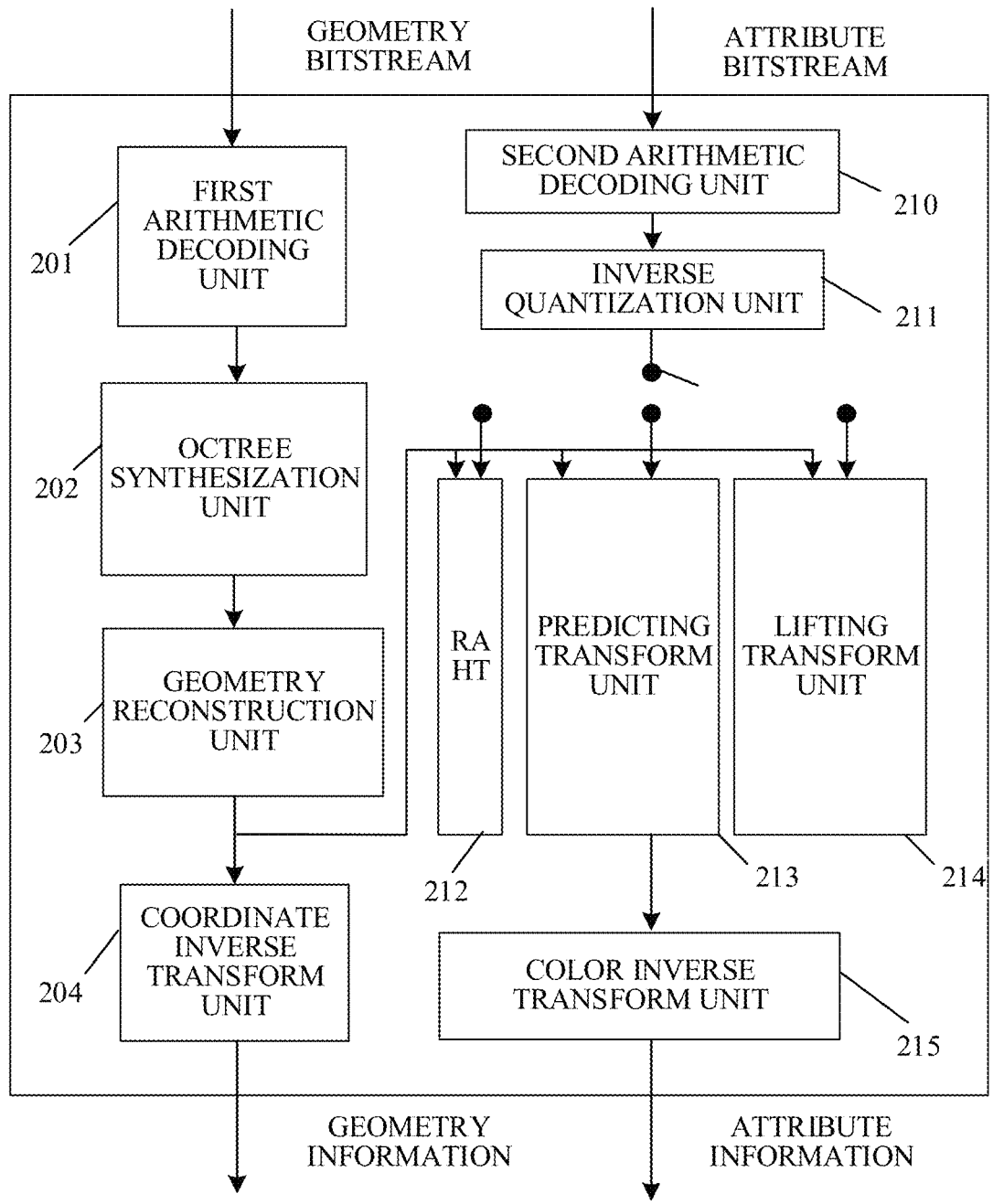
FIG. 3 is a schematic block diagram of a decoding system provided in embodiments of the disclosure.

FIG. 3 is a schematic block diagram of a decoding framework 200 provided in embodiments of the disclosure.

As illustrated in FIG. 3, the decoding framework 200 can obtain a bitstream of a point cloud from an encoding device and obtain position information and attribute information of points in the point cloud by parsing the bitstream. The decoding of the point cloud includes position decoding and attribute decoding.

In one embodiment, the process of position decoding includes: performing arithmetic decoding on the geometry bitstream; performing synthetization after constructing an octree, and reconstructing the position information of the points, to obtain reconstructed information of the position information of the points; and performing coordinate transformation on the reconstructed information of the position information of the points to obtain the position information of the points. The position information of the points may also be referred to as geometry information of the points.

The process of attribute decoding includes: parsing the attribute bitstream to obtain residual values of the attribute information of the points in the point cloud; performing inverse quantization on the residual values of the attribute information of the points, to obtain residual values of the attribute information of the points after inverse quantization; based on the reconstructed information of the position information of the points obtained during position decoding, selecting one of the three prediction modes to perform point cloud prediction, to obtain reconstructed values of the attribute information of the points; and performing color space inverse transformation on the reconstructed values of the attribute information of the points, to obtain the decoded point cloud.

As illustrated in FIG. 3, the position decoding can be achieved with the following units: a first arithmetic decoding unit 201, an octree synthesization unit 202, a geometry reconstruction unit 203, and a coordinate inverse transform unit 204. The attribute decoding can be achieved with the following units: a second arithmetic decoding unit 210, an inverse quantization unit 211, an RAHT unit 212, a predicting transform unit 213, a lifting transform unit 214, and a color inverse transform unit 215.

It should be noted that, decompression is the inverse process of compression, and similarly, functions of various units in the decoding framework 200 can be referred to the functions of corresponding units in the encoding framework 100. Furthermore, the decoding framework 200 can include more or fewer or different functional components than in FIG. 3.

For example, in the decoding framework 200, the point cloud can be partitioned into LODs based on Euclidean distances among points in the point cloud, and then attribute information of the points in the LODs is decoded sequentially. For example, the number of zeros (zero_cnt) in the zero run length coding technique is calculated, to decode the residual based on zero_cnt, and then in the decoding framework 200, inverse quantization may be performed on the decoded residual value, and a reconstructed value of the point is obtained by adding the residual value after inverse quantization and a prediction value of the current point, until all points are decoded. The current point will be used as the nearest neighbor of a subsequent point(s) in the LOD, and the reconstructed value of the current point will be used to predict attribute information of the subsequent point.

Based on the above introduced background, the point cloud encoding method provided in embodiments of the disclosure is described below.

Figure 4:
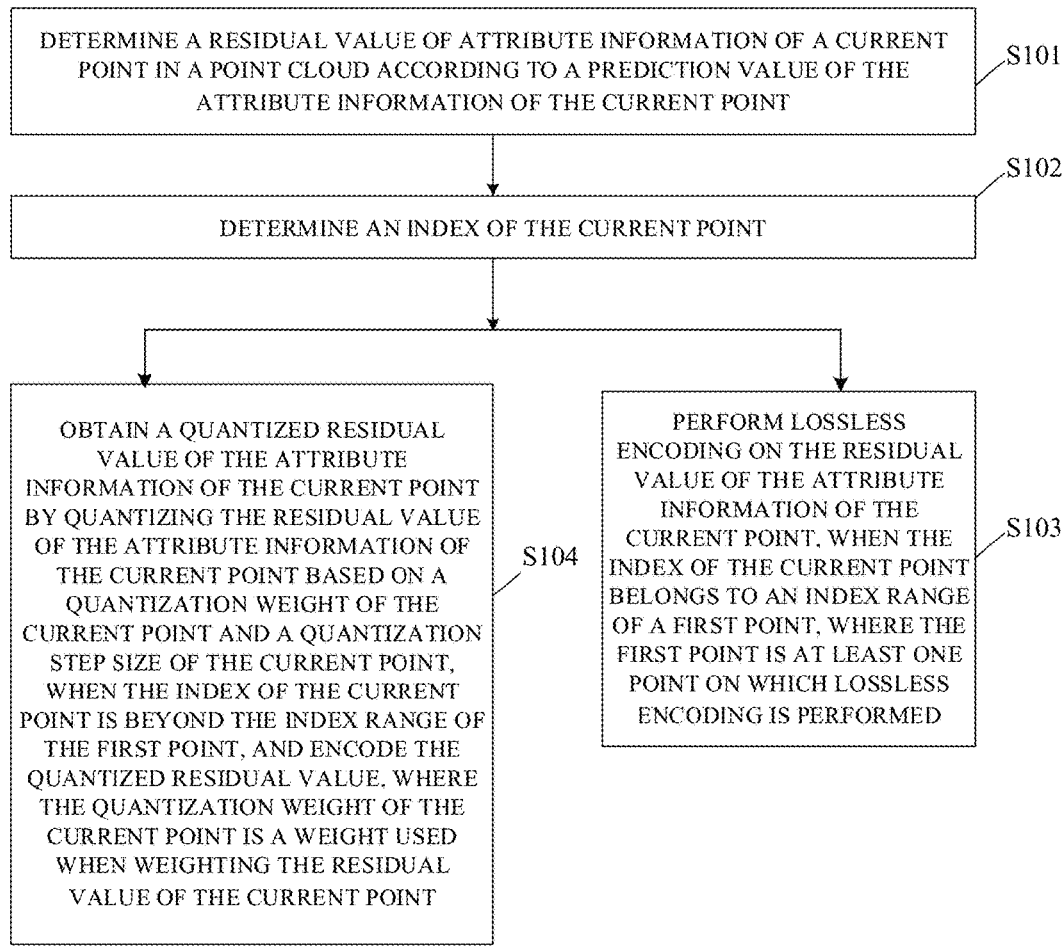
FIG. 4 is flow chart 1 of a point cloud encoding method provided in embodiments of the disclosure.

As illustrated in FIG. 4, embodiments of the disclosure provide a point cloud encoding method. The method is applied to an encoder and includes the following.

S101, a residual value of attribute information of a current point in a point cloud is determined according to a prediction value of the attribute information of the current point.

S102, an index of the current point is determined.

S103, if the index of the current point belongs to an index range of a first point, lossless encoding is performed on the residual value of the attribute information of the current point, where the first point is at least one point on which lossless encoding is performed.

S104, if the index of the current point is beyond the index range of the first point, a quantized residual value of the attribute information of the current point is obtained by quantizing the residual value of the attribute information of the current point based on a quantization weight of the current point and a quantization step size of the current point, and the quantized residual value is encoded, where the quantization weight of the current point is a weight used when weighting the residual value of the current point.

In embodiments of the disclosure, in the process of encoding an image to-be-processed (for example, a three-dimensional image model), a point cloud of the three-dimensional image model to-be-encoded in space is obtained, and the point cloud can include geometry information and attribute information of the three-dimensional image model. In the process of encoding the three-dimensional image model, the geometry information of the point cloud and the attribute information corresponding to each point are encoded separately. The geometry information of the point may also be referred to as position information of the point, and the position information of the point may be three-dimensional coordinate information of the point. The attribute information of the point may include color information and/or reflectivity, etc.

In embodiments of the disclosure, the encoder determines the residual values of the attribute information of the points in the point cloud according to the prediction values of the attribute information of the points in the point cloud. The encoder performs lossless encoding on the residual value of the attribute information of the first point in the point cloud to obtain a first encoding result. The encoder quantizes a residual value of attribute information of a second point in the point cloud based on a quantization weight of the second point and a quantization step size of the second point to obtain a quantized residual value of the attribute information of the second point, where the second point is a point in the point cloud other than the first point, and the quantization weight of the second point is a weight used when weighting the residual value of the second point. The encoder encodes the quantized residual value to obtain a second encoding result. The encoder generates a bitstream based on the first encoding result and the second encoding result.

In embodiments of the disclosure, the encoder encodes the geometry of the points in the point cloud to obtain the reconstructed values of the geometry information of the points in the point cloud. The encoder determines the prediction values of the attribute information of the points in the point cloud according to the reconstructed values of the geometry information of the points in the point cloud. In the process of encoding the current point, the encoder can determine the residual value of the attribute information of the current point according to the prediction value of the attribute information of the current point in the point cloud, and obtains the bitstream based on the residual value.

Specifically, the encoder processes the geometry information of the current point in the point cloud to obtain the reconstructed information of the geometry information of the current point in the point cloud. The encoder obtains the prediction value of the attribute information of the current point according to the reconstructed information of the geometry information of the current point. The encoder processes the attribute information of the current point to obtain the actual value of the attribute information of the current point. The encoder obtains the residual value of the current point according to the prediction value of the attribute information of the current point and the actual value of the attribute information of the current point.

It should be noted that after the encoder completes encoding of the geometry information of the points in the point cloud, the encoder encodes the attribute information of the points in the point cloud. The encoder determines differences between the original values (i.e., the actual values) of the attribute information of the points in the point cloud and the prediction values of the attribute information as the residual values (i.e., prediction residual values) of the attribute information of the points in the point cloud.

In one example, the encoder may determine the obtained original attribute information of the points in the point cloud as the original values, i.e., the actual values, of the attribute information of the points.

In another example, as illustrated in FIG. 1, after obtaining the original attribute information of the points in the point cloud, the encoder performs color space transformation on the original attribute information, such as transforming the RGB color space of the points to YCbCr format or other formats. The attribute transformation is performed on the points after color space transformation to minimize the attribute distortion and obtain the original values, i.e., the actual values, of the attribute information of the points.

For example, for the current point in the point cloud, the prediction value of the attribute information of the current point and the actual value of the attribute information can be obtained according to the above steps, and the difference between the actual value of the attribute information of the current point and the prediction value of the attribute information is taken as the residual value of the attribute information of this point.

For example, the residual value of the attribute information of the point is determined according to the following formula (3):

$$attrResidual = attrValue - attrPredValue \quad (3),$$

where attrResidual is the residual value of the attribute information, attrValue is the actual value of the attribute information, and attrPredValue is the prediction value of the attribute information.

When encoding the current point, the encoder can determine the index of the current point.

It should be noted that in embodiments of the disclosure, the point in the point cloud can have an index, and the index can be understood as a flag of the current point. In addition, the encoder can also signal indexes of points on which lossless encoding is performed into the bitstream and transmit them to the decoder, which is not limited in embodiments of the disclosure.

In some embodiments of the disclosure, the encoder may partition the points in the point cloud according to a preset interval (e.g., equal interval partition), to determine the index range of the first point. The first point is at least one point on which lossless encoding is performed. The index range of the first point is an information set of indexes of points on which lossless encoding can be performed.

In embodiments of the disclosure, in the process of encoding the current point, if the index of the current point belongs to the index range of the first point, lossless encoding is performed on the residual value of the attribute information of the current point, to obtain the bitstream. Alternatively, if the index of the current point does not belong to the index range of the first point, based on the quantization weight of the current point and the quantization step size of the current point, the residual value of the attribute information of the current point is adaptively quantized to obtain the quantized residual value of the attribute information of the current point, and then the quantized residual value is encoded to obtain the bitstream, where the quantization weight of the current point is the weight adopted when weighting the residual value of the current point.

It can be understood that, at present, in the process of encoding the attribute information, the residual unit calculates the residual values of the attribute information based on the original values of the attribute information of the points in the point cloud and the prediction values of the attribute information. The quantization unit quantizes the residual values, so that information that is insensitive to the human eye can be removed, to eliminate visual redundancy. The inverse quantization unit may receive the quantized residual values of the attribute information output by the quantization unit and perform inverse quantization on the quantized residual values of the attribute information to obtain the residual values of the attribute information of the points in the point cloud. The reconstruction unit obtains the residual values of the attribute information of the points in the point cloud output by the inverse quantization unit and the prediction values of the attribute information of the points in the point cloud output by the prediction unit, and obtains the reconstructed values of the attribute information of the points by adding the residual values of the attribute information of the points in the point cloud to the prediction values. The reconstructed values of the attribute information of the points are buffered in the decoding buffer unit, for the subsequent prediction process of other points.

As can be seen from the above, at present, in the process of encoding the attribute information, the residual value of the attribute information of the current point is quantized. However, the quantization causes errors in the reconstructed values of the attribute information, which further reduces the subsequent prediction accuracy of the attribute information, thereby reducing the overall encoding effect of the attribute information. To solve the technical problem, in the disclosure, the residual value of the attribute information of the current point in the point cloud is processed. That is, lossless encoding is performed on the residual value of the attribute information of the at least one point in the point cloud, to reduce the influence of quantization on the reconstructed value of the attribute information, which further improves the prediction accuracy of the attribute information without bringing significant influence on the size of the attribute bitstream, thereby improving the encoding effect of the attribute information.

In addition, in the process of predicting the attribute information of other points in the point cloud than the first point on which lossless encoding is performed, the quantization weight for weighting the quantization step size of the current point is introduced, and the residual value of the current point is quantized with the quantization weight of the current point and the quantization step size of the current point to obtain the quantized residual value of the attribute information of the current point, and then the quantized residual value is encoded to obtain the bitstream. By introducing the quantization weight of the current point, the quantization step size of the current point is modified based on the quantization weight of the current point, that is, the quantization step size of the current point can be adaptively adjusted according to the importance degree of the current point, and then the residual value of the current point is quantized based on the adjusted quantization step size. In the process of predicting the attribute information of the points in the point cloud, for the points at the high positions in the encoding order, which are important in the prediction, the quantization step sizes thereof will not be very large, and the large reconstruction error can be avoided, that is, the point with a high quantization weight can be quantized with a smaller quantization step size to reduce the reconstruction error. For the points at the lower positions in the encoding order, the prediction accuracy and encoding effect can be improved.

In some embodiments of the disclosure, lossless encoding on the residual value of the attribute information of the current point in the disclosure may also be referred to as not performing quantization on the residual value of the attribute information of the current point.

The number of points for which lossless encoding is performed on residual values of attribute information is not limited in the disclosure. For example, in the point cloud, residual values of attribute information of some points are quantized and residual values of attribute information of some other points are not quantized (i.e., lossless encoding is performed), or residual values of attribute information of all points in the point cloud are not quantized (i.e., lossless encoding is performed), which is not limited in embodiments of the disclosure.

In one example, the at least one point for which lossless encoding is performed on the residual value of the attribute information may be N points.

Optionally, N is an integer multiple of 2. For example, lossless encoding is performed on the residual values of the attribute information of 2, 4, 16, or 24 points in the point cloud.

Optionally, the N points may be any N points in the point cloud, such as contiguous N points in the sorted point cloud, or randomly selected N points, or specified N points, or N points selected according to a preset point-selecting interval, where the point-selecting interval may be an uneven interval.

Optionally, each two neighbouring points in the N points have an equal interval. For example, the point cloud includes 1200 points, and if N is 24, the interval between each two neighbouring points in the 24 points is equal, which is 50 points.

Exemplarily, for example, if the point cloud includes 1200 points and the preset interval is 9 points, lossless encoding is performed on residual values of attribute information of points spaced at 9 points in the sorted point cloud. Among the 1200 points, the 1st point can be used as the first point whose residual value of attribute information is not to be quantized, and the 11th point, spaced apart from the 1st point by 9 points, is used as the second point whose residual value of attribute information is not to be quantized, and so on. Optionally, among the 1200 points, the 11th point can be used as the first point whose residual value of attribute information is not quantized, and the 21th point, spaced at 9 points, is used as the second point whose residual value of attribute information is not quantized, and so on.

In some embodiments of the disclosure, the encoder can perform LOD partition on the point cloud according to the geometry information of the points in the point cloud, to obtain multiple LOD layers of the point cloud, each LOD layer including one or more points. The preset interval may include a first preset interval and a second preset interval, and the index range of the first point includes a first index range and a second index range. Then, the encoder can obtain the first index range of the first point by partitioning (such as equal interval partition) at least one point in first M LOD layers in the multiple LOD layers according to the first preset interval, and obtain the second index range of the first point by partitioning (such as equal interval partition) at least one point in remaining LOD layers other than the first M LOD layers in the multiple LOD layers according to the second preset interval, where M is greater than and equal to 1 and is less than a total number of layers of the multiple LOD layers, and the first preset interval is less than the second preset interval.

It should be noted that, the values of the first preset interval and the second preset interval are not limited embodiments of the disclosure.

That is, for multiple points in each LOD layer, first points at different preset intervals can be selected. Since points in first several LOD layers will affect the prediction results of points in the subsequent LOD layers, the prediction results of the points in the first several LOD layers are more important. Therefore, the first preset interval of each of the first M layers (for example, first seven LOD layers: LOD0~LOD6) is less than the second preset interval of each of the remaining layers. That is, the encoder can select from the first M LOD layers more points at equal intervals whose attribute residual values are not quantized, such as 32 (intermittent_unquantized_num) points, and the number of points at equal intervals which are not quantized in each of subsequent LOD layers is relatively small, such as 10 (intermittent_unquantized_num/3) points.

Figure 5A:
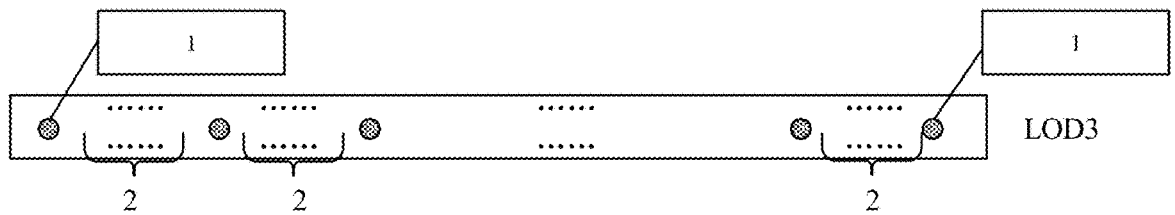
FIG. 5A is a schematic diagram of LOD3 layer provided in embodiments of the disclosure.
Figure 5B:
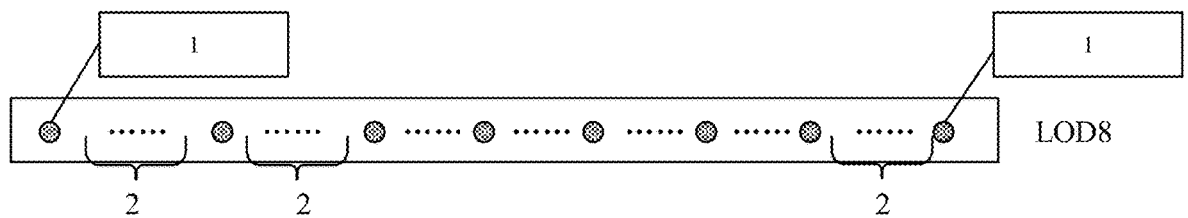
FIG. 5B is a schematic diagram of LOD8 layer provided in embodiments of the disclosure.

Exemplarily, if the number of LOD layers is greater than 8, intermittent_unquantized_num=32 from LOD0 to LOD6. Taking a third LOD layer as an example, that is, LOD3, as illustrated in FIG. 5A, starting from the first one point (i.e., $1^{st}$ point), which is a point on which lossless encoding is performed, one point is taken at every 32 intervals as the first point 1 (◉) on which lossless encoding is performed, where other points 2 (,) except the first point are adaptively quantized during encoding. From LOD7 to LODend: intermittent_unquantized_num/3=10, taking an eighth LOD layer as an example, that is, LODE, as illustrated in FIG. 5B, starting from the first one point, which is a point on which lossless encoding is performed, one point is taken at every 10 intervals as the first point 1 (◉) on which lossless encoding is performed, where other points (,) except the first point are adaptively quantized during encoding.

It should be noted that, for the points in each LOD layer, the first one point may be or not be the point on which lossless encoding is performed, which is not limited in embodiments of the disclosure.

In some embodiments of the disclosure, when the encoder is encoding the current point, the current point is a point in any one of the multiple LOD layers. Moreover, after obtaining the number of points in the point cloud whose indexes belong to the index range of the first point, the encoder can signal the number of points into the bitstream for decoding of the decoder. The number of points includes the number of points in each LOD layer belonging to the first point, that is, the encoder obtains the number of points in each LOD layer, where each of the points has an index within the index range of the first point. That is, the bitstream carries the specific number (num) of points at equal intervals in each LOD layer for which lossless encoding is performed on the residual value of the attribute information, that is, num is carried in the attribute bitstream.

In practical application, the encoder performs lossless encoding on the residual value of the attribute information of the current point as follows.

Manner 1: quantization of the residual value of the attribute information of the current point is skipped.

Manner 2: the quantization step size of the current point is set to 1. For example, currently, quantization of the residual value of the attribute information of the point is performed according to the following formula (4):

$$attrResidualQuant = \frac{attrValue - attrPredValue}{Qstep}, \quad (4)$$

where at t r Resi dual Quant is the quantized residual value of the attribute information and Qst ep is the quantization step size.

Manner 3: the quantization parameter QP of the current point is set as a target value, where the target value is the QP value corresponding to the quantization step size of 1.

The quantization step size is calculated from the quantization parameter QP value, and the QP value is usually pre-configured through the profile. Based on this, the QP can be set to the QP value corresponding to the quantization step size of 1.

It can be understood that, for the first M LOD layers which are more important, more points on which lossless encoding is performed are selected, while for the last several LOD layers which are less important, fewer points on which lossless encoding is performed are selected. As such, the accuracy of encoding information of important points can be effectively ensured, thereby improving the accuracy of the whole encoding.

In embodiments of the disclosure, the encoder may perform lossless encoding on an attribute residual value of at least one point in at least one LOD layer.

In some embodiments, the encoder may perform lossless encoding on an attribute residual value of at least one point in one LOD layer. Alternatively, the encoder may perform lossless encoding on an attribute residual value of at least one point in some LOD layers of the multiple LOD layers, and adaptively quantize an attribute residual value of each point in some other LOD layer of the multiple LOD layers. Alternatively, the encoder may perform lossless encoding on an attribute residual value of at least one point in each of the multiple LOD layers, or the like, which is not limited in embodiments of the disclosure.

In some embodiments of the disclosure, the encoder can obtain from the multiple LOD layers at least one first type of LOD layer in which a total number of points is less than or equal to a first preset value and at least one second type of LOD layer in which a total number of points is greater than the first preset value. The first preset value is determined according to actual needs, which is not limited in the disclosure. The encoder can further perform lossless encoding on residual values of attribute information of all points in the first type of LOD layer, and perform lossless encoding on a residual value of attribute information of at least one point in the second type of LOD layer.

As can be seen from the above, the number of points included in each layer of the multiple LOD layers may be the same or different. Based on this, according to the total number of points included in each LOD layer in the multiple LOD layers, the multiple LOD layers are partitioned into the first type of LOD layer and the second type of LOD layer, where the total number of points included in each first type of LOD layer is less than or equal to the first preset value, and the total number of points included in each second type of LOD layer is greater than the first preset value. In selecting first points for which lossless encoding is performed on the residual values of the attribute information, different second type of LOD layers may use different skip quantization point-selecting manners, for example, each second type of LOD layer has a different point-selecting manner. Optionally, different second type of LOD layers may use the same skip quantization point-selecting manner, for example, each second type of LOD layer use the same point-selecting manner.

In some embodiments, for consistency of the encoding end and the decoding end, the encoding end may carry the relevant information on the first type of LOD layer and the second type of LOD layer into the attribute bitstream. In this way, the decoding end can parse the attribute bitstream to obtain the relevant information on the first type of LOD layer and the second type of LOD layer, and reconstruct the attribute information of the point according to the parsed relevant information on the first type of LOD layer and the second type of LOD layer.

In some embodiments, if the number of points in each second type of LOD layer for which lossless encoding is performed on residual values of attribute information is the same, lossless encoding is performed on residual values of attribute information of M points in the second type of LOD layer, where M is a positive integer multiple of 2, e.g., 2, 4, 24, 32, etc. Furthermore, the interval between two neighbouring points in M points in one second type of LOD layer is equal.

In some embodiments, if the at least one second type of LOD layer includes L second type of LOD layers and the numbers of first points in different second type of LOD layers for which lossless encoding is performed on residual values of attribute information may be different. Lossless encoding is performed on residual values of attribute information of a first number of points in each of P second type of LOD layers. Lossless encoding is performed on residual values of attribute information of a second number of points in each of Q second type of LOD layers. L is a positive integer greater than or equal to 2, P and Q each are positive integers and a sum of P and Q is less than or equal to L, the P second type of LOD layers do not overlap with the Q second type of LOD layers, and the first number is different from the second number.

The P second type of LOD layers can be any P second type of LOD layers among the L second type of LOD layers, and the P second type of LOD layers can be contiguous second type of LOD layers or intermittent second type of LOD layers.

The Q second type of LOD layers can be any Q second type of LOD layers other than the P second type of LOD layers among the L second type of LOD layers, and the Q second type of LOD layers can be contiguous second type of LOD layers or intermittent second type of LOD layers.

If L is equal to 12, P (e.g., P=7) second type of LOD layers are arbitrarily selected from the 12 second type of LOD layers, and Q (e.g., Q=5) second type of LOD layers are arbitrarily selected from the remaining 5 second type of LOD layers.

In one example, the P second type of LOD layers are first P second type of LOD layers in the L second type of LOD layers.

In one example, the Q second type of LOD layers are last Q second type of LOD layers in the L second type of LOD layers.

The first P (e.g., P=7) second type of LOD layers in the 12 second type of LOD layers are used as the P second type of LOD layers, and the last Q (e.g., Q=5) second type of LOD layers in the 12 second type of LOD layers are used as the Q second type of LOD layers. The P second type of LOD layers are contiguous and the Q second type of LOD layers are contiguous.

In some embodiments, if the multiple LOD layers of the point cloud include 14 LOD layers, P can be 7 or 8.

In one example, the last one second type of LOD layer in the P second type of LOD layers is adjacent to the first one second type of LOD layer in the Q second type of LOD layers. For example, if P=7 and Q=7, then the last one second type of LOD layer in the P second type of LOD layers is the seventh LOD layer, the first one second type of LOD layer in the Q second type of LOD layers is the eighth LOD layer, and the seventh LOD layer is adjacent to the eighth LOD layer.

According to the above method, the L second type of LOD layers are partitioned into the P second type of LOD layers and the Q second type of LOD layers. For each of the P second type of LOD layers, the residual values of the attribute information of points of the first number in the second type of LOD layer are not quantized. For each of the Q second type of LOD layers, the residual values of the attribute information of points of the second number in the second type of LOD layer are not quantized.

If the P second type of LOD layers precede the Q second type of LOD layers, the first number is greater than the second number, for example, the first number is 24, 32, or 64, and the corresponding second number can be 8, 16, or 32. In the prediction process of the attribute information, the multiple LOD layers are sorted according to the layer number from lowest to highest to obtain the LOD order of the point cloud, and the attribute information is encoded according to the LOD order of the point cloud. In the prediction process, the points ranked higher in the LOD order have a higher chance of being used as reference points in the subsequent prediction process. Therefore, to reduce the influence of quantization on the reconstructed values of the attribute information, the residual values of the attribute information of more points in the P second type of LOD layers that are ranked higher are not quantized. To eliminate redundancy, the residual values of the attribute information of fewer points in the Q second type of LOD layers that are ranked lower are not quantized.

In some embodiments, the first number is a positive integer multiple of the second number, e.g., the first number is 3 times or 2 times the second number, e.g., the first number is 24 and the second number is 8.

In one example, the interval between two neighbouring points in the first number of points in each of the P second type of LOD layers is equal.

In one example, the interval between two neighbouring points in the second number of points in each of the Q second type of LOD layers is equal.

It can be understood that, for the more important type of LOD layer, more points on which lossless encoding is performed are selected, while for the less important type of LOD layer, fewer points on which lossless encoding is performed are selected. As such, the accuracy of encoding information of important points can be effectively ensured, thereby improving the accuracy of the whole encoding.

Figure 6:
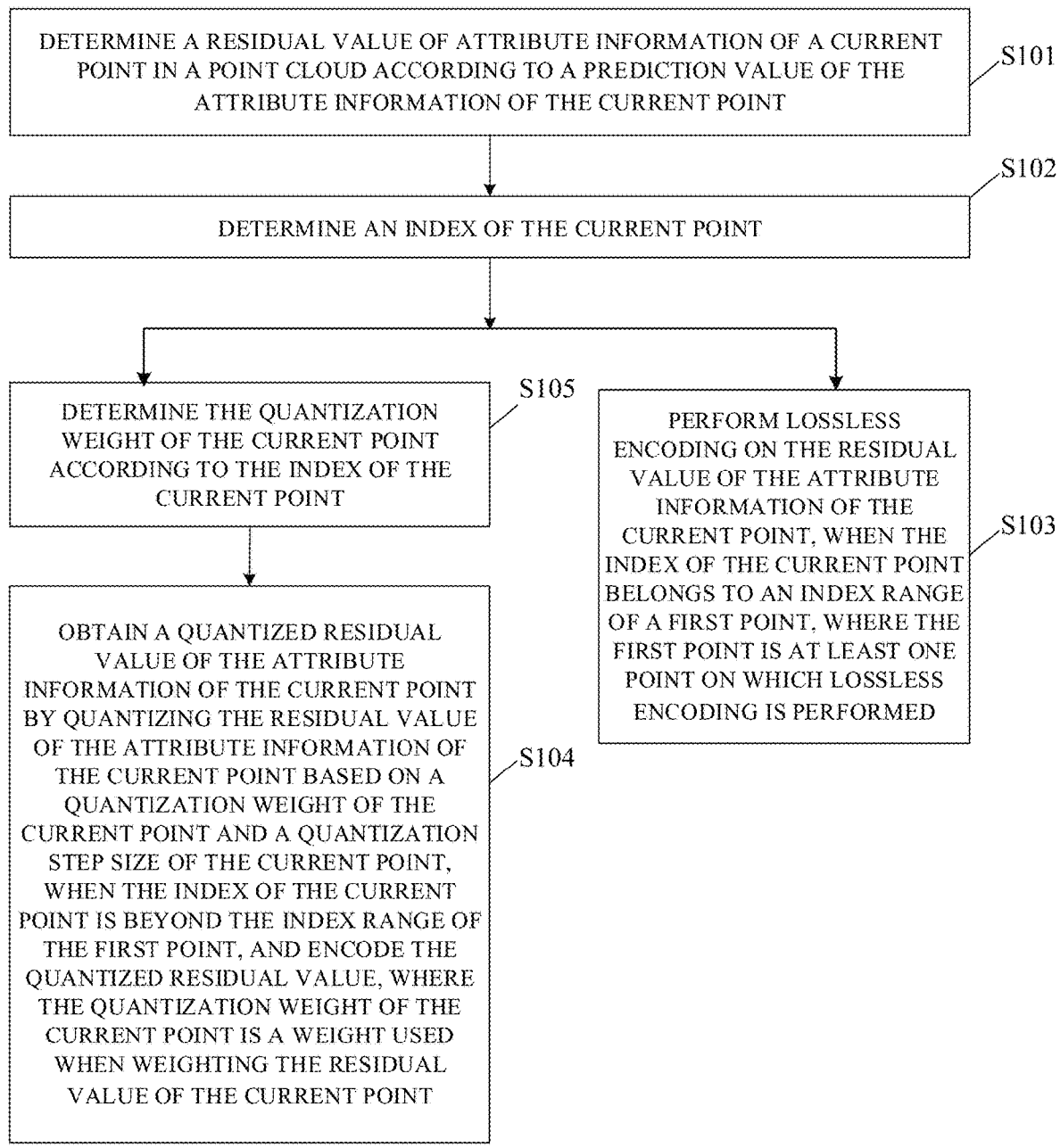
FIG. 6 is flow chart 2 of a point cloud encoding method provided in embodiments of the disclosure.

In some embodiments of the disclosure, based on FIG. 4, as illustrated in FIG. 6, a point cloud encoding method provided in embodiments of the disclosure further includes S105. Refer to the following.

S105, the quantization weight of the current point is determined according to the index of the current point.

In embodiments of the disclosure, the encoder may obtain quantization weights of the points based on indexes of the points.

In embodiments of the disclosure, the quantization weights of the point cloud are stored as an array, and the dimension of the array is the same as the number of the points in the point cloud. For example, QuantWeight [index] represents the quantization weight of the index of the point equal to index. In this case, QuantWeight [ ] can be understood as an array that stores the quantization weights of all points in the point cloud. The dimension of the array is consistent with the number of the points in the point cloud, and the quantization weight of the point can be found through the index of the point.

In some embodiments of the disclosure, the encoder partitions the point cloud into one or more LOD layers, each LOD layer including one or more points. Initial values of quantization weights of points in first M LOD layers in the multiple LOD layers are greater than initial values of quantization weights of points in remaining LOD layers other than the first M LOD layers in the multiple LOD layers. M is an integer greater than 0. For example, the initial value of the quantization weight of each point in the first seven LOD layers is set to 512, and the initial value of the quantization weight of each point in the remaining LOD layers is set to 256.

In one implementation, the encoder may traverse points in the point cloud in a reverse order of an encoding order of the point cloud and update quantization weights of N nearest neighbouring points of the current point based on quantization weight of the current point, where N is an integer greater than 0. For example, for the current point, the quantization weight of each of the N nearest neighbouring points of the current point is updated based on the quantization weight of the current point, where N is an integer greater than 0. In one implementation, an influence weight of the current point on each of the N nearest neighbouring points is obtained, where the influence weight depends on position information of the current point and the N nearest neighbouring points. The quantization weights of the N nearest neighbouring points are updated based on the quantization weight of the current point and the influence weight of the current point on each of the N nearest neighbouring points. In one implementation, an attribute parameter set of the point cloud includes the influence weight of the current point on each of the N nearest neighbouring points. According to the attribute parameter set, the influence weight of the current point on each of the N nearest neighbouring points is obtained. That is, the influence weight of the current point on each of the N nearest neighbouring points is obtained according to the attribute parameter set of the point cloud, where the attribute parameter set of the point cloud includes a preset influence weight of the current point on each of N nearest neighbouring points.

It should be noted that the initial value of the quantization weight of each point in the point cloud is a preset value.

It should be noted that, in embodiments of the disclosure, the specific value of the initial value is not limited. As an example, the initial value may be 256, 512, or other specific values. Initializing to 256 is to set the quantization weights of all points in the point cloud to 256.

In embodiments of the disclosure, after the encoder traverses each point in the point cloud in the reverse order, the quantization weight of each point is updated according to its importance in the process of predicting the attribute information of the points in the point cloud, and the more important the point, the larger the quantization weight. That is, the influence weight of the current point on each of the N nearest neighbouring points decreases as a distance between the current point and each of the nearest neighbouring points increases.

In one implementation, the quantization weight of the current point is multiplied by the influence weight of the current point on each of the N nearest neighbouring points, the quantization weight of the current point after the multiplying is right-shifted by a second preset bit, and then the quantization weight of the current point after the right shifting is added with the quantization weight before updating of each nearest neighbouring point, to update the quantization weights of the N nearest neighbouring points.

The quantization weights of the N nearest neighbouring points are updated based on the following formula (5):

$$\text{newneighborQuantWeight}[i]=\text{neighborQuantWeight}[i]+(T[i]*\text{QuantWeight}[\text{index-}c])\gg k \quad (5),$$

where newneighborQuantWeight[i] denotes a quantization weight of an i-th nearest neighbouring point after updating based on the quantization weight of the current point, neighborQuantWeight[i] denotes a quantization weight of the i-th nearest neighbouring point before updating based on the quantization weight of the current point, QuantWeight[index-c] denotes the quantization weight of the current point, T[i] denotes an influence weight of the current point on the i-th nearest neighbouring point, and k denotes the number of bits for right-shift operation on T[i]*QuantWeight[index-c], that is, the second preset bit. The value of T[i] decreases with the increase of i. For example, k=8, T[i] is the power of 2, for example $2^{5-i}$.

Figure 7:
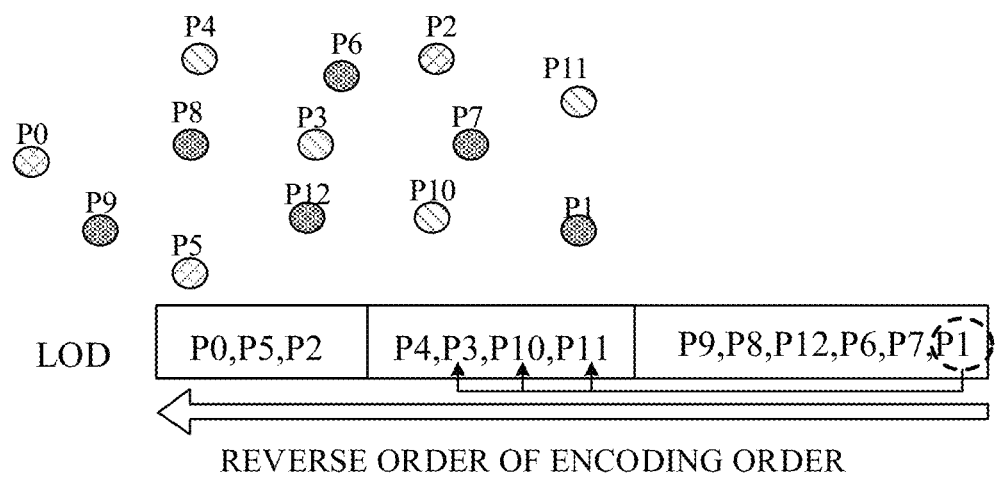
FIG. 7 is schematic diagram 2 of a LOD layer provided in embodiments of the disclosure.

As an example, as illustrated in FIG. 7, if the initial values of the quantization weights of all points in the point cloud are set to 256, each point is traversed in the reverse order of the encoding order (i.e., points P1-P7-P6-P12-P8-P9-P11-P10-P3-P4-P2-P5-P0-) to update the quantization weights of its three nearest neighbouring points. Assuming that the index of the currently traversed point is index1 and the indexes of the three nearest neighbouring points of the current point are respectively indexN10, indexN11, and indexN3, the quantization weights of the three nearest neighbouring points of the current point can be recorded as formulas (6)-(8):

$$\text{neighborQuantWeight}[0]=\text{QuantWeight}[\text{index}N10] \quad (6)$$

$$\text{neighborQuantWeight}[1]=\text{QuantWeight}[\text{index}N11] \quad (7)$$

$$\text{neighborQuantWeight}[2]=\text{QuantWeight}[\text{index}N3] \quad (8).$$

The quantization weights of its three nearest neighbouring points are updated by using the quantization weight of the current point, referring to the following formulas (9)-(11):

$$\text{newneighborQuantWeight}[0]=\text{neighborQuantWeight}[10]+(16\times\text{QuantWeight}[\text{index1}])\gg 8 \quad (9)$$

$$\text{newneighborQuantWeight}[1]=\text{neighborQuantWeight}[11]+(8\times\text{QuantWeight}[\text{index1}])\gg 8 \quad (10)$$

$$\text{newneighborQuantWeight}[2]=\text{neighborQuantWeight}[3]+(4\times\text{QuantWeight}[\text{index1}])\gg 8 \quad (11),$$

where k has a value of 8. 16, 8, and 4 respectively are influence weights of the current point on the nearest neighbouring points 10, 11, and 3. The influence weights can be syntax defined in the attribute parameter set of the point cloud, that is, the values of the influence weights can be set through the attribute parameter set. The encoder may activate or access the attribute parameter set during encoding the attribute information, and then invoke the values of the influence weights of the points from the attribute parameter set. ">>" denotes right-shift operation. In embodiments of the disclosure, the specific values of k and the influence weights are not limited in the disclosure and the above values are merely illustrative and should not be construed as limiting to the disclosure. For example, in an alternative embodiment of the disclosure, the influence weights of the $1^{st}$, $2^{nd}$, $3^{rd}$ nearest neighbouring points may also be changed to 64, 32, and 16 or 32, 16, and 8 respectively. Assume that the quantization weight of the current point is 256, and the quantization weight of the nearest neighbouring point 10 (i.e., the first nearest neighbouring point) is also 256, the influence weights of the first, second, and third nearest neighbouring points are 32, 16, and 8 respectively, and the result of (32×256)>>8 is 32, that is, the operation result is shifted to the right by 8 bits. In this case, the quantization weight of the nearest neighbouring point 10 is updated to 256+32=288, which can be stored in the array QuantWeight [ ] containing the quantization weights of all points in the point cloud. When traversing to the nearest neighbouring point 10, the quantization weight 288 is used to update the three neighbors of the nearest neighbouring point 10.

It should be noted that, in embodiments of the disclosure, the quantization weights of the points in the point cloud are used after being updated in this way.

In some embodiments of the disclosure, the encoder obtains the quantized residual value of the attribute information of the current point by quantizing the residual value of the attribute information of the current point based on the quantization weight of the current point and the quantization step size of the current point as follows.

S1041, an effective quantization weight of the current point is determined based on the quantization weight of the current point.

In embodiments of the disclosure, the effective quantization weight is less than or equal to the quantization step size of the current point.

The encoder determines the effective quantization weight of the current point based on the quantization weight of the current point in the following two manners.

Manner 1: the encoder compares the quantization weight of the current point with the quantization step size of the current point, to determine a first minimum value; and determines the first minimum value as the effective quantization weight of the current point.

As an example, the effective quantization weight of the current point is determined using the following formula (12):

effectiveQuantWeight=min(QuantWeight[index], Qstep) (12).

Manner 2: the encoder compares the quantization weight of the current point after right shifting by a first preset bit with the quantization step size of the current point, to determine a second minimum value, and determines the second minimum value as the effective quantization weight of the current point.

As an example, the effective quantization weight of the current point is determined using the following formula (13):

effectiveQuantWeight=min(QuantWeight[index]>>k, Qstep) (13), where effectiveQuantWeight indicates the effective quantization weight of the current point, QuantWeight[index] indicates the quantization weight of the current point, k indicates the number of bits for the right-shift operation on QuantWeight[index], and Qstep indicates the quantization step size of the current point.

In some embodiments of the disclosure, the value of the effective quantization weight is equal to an integer power of 2.

In some embodiments of the disclosure, the value of the quantization weight of the current point is not equal to an integer power of 2, and an integer power of 2 closest to the quantization weight of the current point is determined as the effective quantization weight based on the value of the quantization weight of the current point.

For example, assuming that the value of the quantization weight of the current point is 18, for the convenience of hardware implementation, 18 can be converted to an integer power of 2 closest to 18, i.e., 16 or 32. For example, 18 is converted to 16, i.e., 18 is replaced by 16. Assuming that the quantization weight of the current point is 30, an integer power of 2 closest to 30 will become 32, and in this case, the quantization weight of the current point will be converted to 32. For the integer power of 2, the function of adaptive quantization can be realized by binary shift operation, which is convenient for hardware implementation.

In embodiments of the disclosure, by constructing the value of the effective quantization weight as an integer power of 2, the weighted multiplication operation can be processed as the shift operation, which can improve the processing efficiency of the encoder and further improve the performance of the encoder.

It should be noted that in other alternative embodiments of the disclosure, the minimum value can be taken from the quantization weight of the current point and the quantization step size of the current point, and then an integer power of 2 closest to the minimum value is determined as the effective quantization weight. The effective quantification weight may also be determined in other ways and embodiments of the disclosure are not specifically limited thereto. For example, the quantization weight of the current point can be directly determined as the effective quantization weight of the current point.

S1042, the quantized residual value is obtained by quantizing the residual value with the effective quantization weight of the current point and the quantization step size of the current point.

In some embodiments of the disclosure, the encoder obtains a weighted residual value by multiplying the effective quantization weight by the residual value; and obtains the quantized residual value by quantizing the weighted residual value with the quantization step size of the current point.

In embodiments of the disclosure, the encoder can obtain the prediction value of the attribute information of the current point through the predicting transform. The actual value of the attribute information of the current point is known, and then the residual value of the attribute information of the current point can be obtained by subtracting the prediction value from the actual value. The residual value is multiplied by the effective quantization weight to obtain the weighted residual value. The weighted residual value can be quantized by using the quantization step size to obtain the quantized weighted residual value, i.e., the quantized residual value. Then, the quantized residual value of the current point is signalled into the bitstream through entropy coding.

In embodiments of the disclosure, before quantization, the encoder multiplies the residual value by the effective quantization weight for weighting. It should be noted that since quantization is not lossless, the weighted residual value obtained by the decoder is not necessarily equal to the weighted residual value obtained by the encoder.

As an example, the residual value is quantized by using the following formula (14) to obtain the quantized residual value:

$$attrResidualQuant2 = attrResidualQuant1 \times effectiveQuantWeight/Qstep \quad (14),$$

where attrResidualQuant2 denotes the quantized residual value, attrResidualQuant1 denotes the residual value, effectiveQuantWeight denotes the effective quantization weight of the current point, and Qstep denotes the quantization step size of the current point.

In embodiments of the disclosure, when the quantization step size of the current point is set small, the quantization weight of the current point may exceed the quantization step size. In this case, the smaller of the quantization weight and the quantization step size is obtained as the effective quantization weight. As such, the encoder can quantize the residual value, that is, the encoding performance of the encoder can be ensured.

The point cloud decoding method provided in embodiments of the disclosure is described below.

Figure 8:
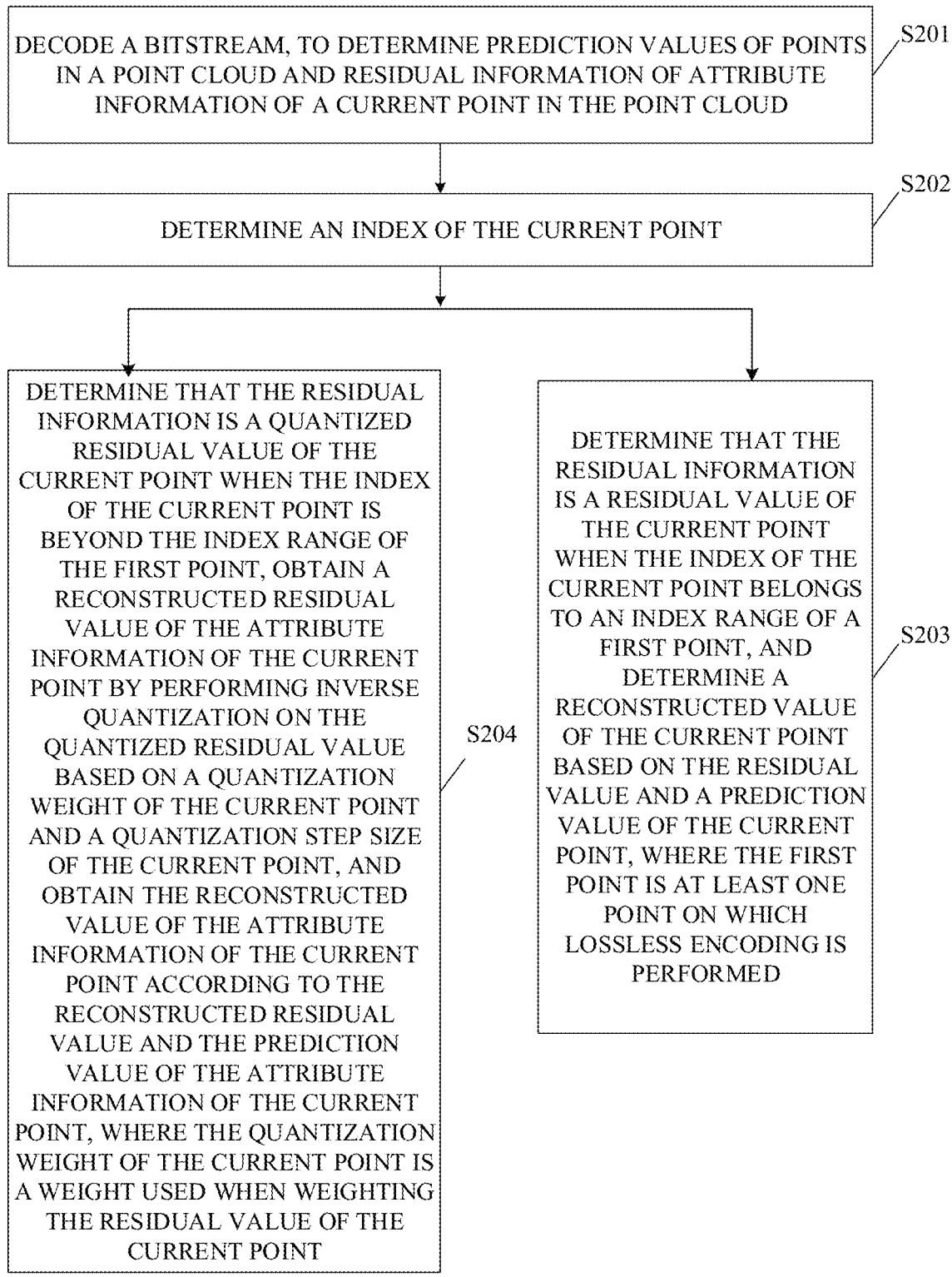
FIG. 8 is flow chart 1 of a point cloud decoding method provided in embodiments of the disclosure.

As illustrated in FIG. 8, embodiments of the disclosure provide a point cloud decoding method. The method is applied to a decoder and include the following.

S201, a bitstream is decoded, to determine prediction values of points in a point cloud and residual information of attribute information of a current point in the point cloud.

S202, an index of the current point is determined.

In some embodiments of the disclosure, the decoder may decode the bitstream to determine geometry information of the points in the point cloud and the residual information of the attribute information of the current point in the point cloud. According to the geometry information of the points in the point cloud, a prediction value of the attribute information of the current point in the point cloud is determined.

In embodiments of the disclosure, after the decoding of the geometry information of the points in the point cloud is completed, the decoding of the attribute information is performed. After the decoding of the geometry bitstream is completed, the geometry information of the points in the point cloud can be obtained. The decoder decodes the bitstream of the geometry information of the points in the point cloud to obtain the reconstructed values of the geometry information of the points in the point cloud. According to the reconstructed values of the geometry information of the points in the point cloud, the prediction value of the attribute information of each point in the point cloud is determined, which also includes the prediction value of the attribute information of the current point. Moreover, the residual information of the current point can be parsed from the bitstream.

It should be noted that, in embodiments of the disclosure, the residual information may include a residual value (parsed out for a first point on which lossless encoding is performed) or a quantized residual value (parsed out for a point other than the first point on which lossless encoding is performed).

When the decoder decodes the current point, it can determine the index of the current point. The decoder may also parse the bitstream to obtain indexes of points on which lossless encoding can be performed, to distinguish what kind of decoding operation is to be performed on the current point. However, if the decoder directly determines the index of the current point, and then calculates whether the current point belongs to the first point and determines whether it has been subject to lossless encoding, the transmission rate of the bitstream can be improved and the code words can be saved.

S203, if the index of the current point belongs to an index range of the first point, determine that the residual information is a residual value of the current point, and a reconstructed value of the current point is determined based on the residual value and a prediction value of the current point, where the first point is at least one point on which lossless encoding is performed.

S204, if the index of the current point is beyond the index range of the first point, determine that the residual information is a quantized residual value of the current point, a reconstructed residual value of the attribute information of the current point is obtained by performing inverse quantization on the quantized residual value based on a quantization weight of the current point and a quantization step size of the current point, and the reconstructed value of the attribute information of the current point is obtained according to the reconstructed residual value and the prediction value of the attribute information of the current point, where the quantization weight of the current point is a weight used when weighting the residual value of the current point.

In some embodiments of the disclosure, the decoder may partition the points in the point cloud according to a preset interval (e.g., equal interval partition), to determine the index range of the first point. The first point is at least one point on which lossless encoding is performed. The index range of the first point is an information set of indexes of points on which lossless encoding can be performed. In some embodiments of the disclosure, the decoder may perform the equal interval partition on the points in the point cloud according to the preset interval, to determine the index range of the first point. The first point is the at least one point on which lossless encoding is performed. The index range of the first point is the information set of indexes of points on which lossless encoding can be performed.

In embodiments of the disclosure, in the process of decoding the current point, if the index of the current point belongs to the index range of the first point, the residual information is the residual value of the current point, and the reconstructed value of the current point is determined based on the residual value and the prediction value of the current point. Alternatively, if the index of the current point does not belong to the index range of the first point, the residual information is the quantized residual value of the current point, based on the quantization weight of the current point and the quantization step size of the current point, the quantized residual value is inversely quantized to obtain the reconstructed residual value of the attribute information of the current point, and the reconstructed value of the attribute information of the current point is obtained according to the reconstructed residual value and the prediction value of the attribute information of the current point, where the quantization weight of the current point is the weight used when weighting the residual value of the current point.

It can be understood that, at present, in the process of encoding the attribute information, the residual unit calculates the residual values of the attribute information based on the original values of the attribute information of the points in the point cloud and the prediction values of the attribute information. The quantization unit quantizes the residual values, so that information that is insensitive to the human eye can be removed, to eliminate visual redundancy. The inverse quantization unit may receive the quantized residual values of the attribute information output by the quantization unit and perform inverse quantization on the quantized residual values of the attribute information to obtain the residual values of the attribute information of the points in the point cloud. The reconstruction unit obtains the residual values of the attribute information of the points in the point cloud output by the inverse quantization unit and the prediction values of the attribute information of the points in the point cloud output by the prediction unit, and obtains the reconstructed values of the attribute information of the points by adding the residual values of the attribute information of the points in the point cloud to the prediction values. The reconstructed values of the attribute information of the points are buffered in the decoding buffer unit, for the subsequent prediction process of other points.

As can be seen from the above, at present, in the process of decoding the attribute information, the residual value of the attribute information of the current point is quantized. However, inverse quantization causes errors in the reconstructed values of the attribute information, which further reduces the subsequent prediction accuracy of the attribute information, thereby reducing the overall decoding effect of the attribute information. To solve the technical problem, in the disclosure, the residual information of the attribute information of the current point belonging to the first point in the point cloud is the residual value, which is not quantized. Thus, inverse quantization is performed during decoding, and it is directly used. As such, lossless decoding can be performed on the residual value of the attribute information of the at least one point in the point cloud, and the influence of quantization on the reconstructed value of the attribute information can be reduced, which further improves the prediction accuracy of the attribute information without bringing significant influence on the size of the attribute bitstream, thereby improving the decoding effect of the attribute information.

In addition, in the process of decoding the attribute information of other points in the point cloud than the first point on which lossless encoding is performed, the quantization weight for weighting the quantization step size of the current point is introduced, and the residual information of the current point is inversely quantized with the quantization weight of the current point and the quantization step size of the current point to obtain the quantized residual value of the attribute information of the current point, and then the quantized residual value is decoded to obtain the bitstream. By introducing the quantization weight of the current point, the quantization step size of the current point is modified based on the quantization weight of the current point, that is, the quantization step size of the current point can be adaptively adjusted according to the importance degree of the current point, and then the residual value of the current point is inversely quantized based on the adjusted quantization step size. In the process of decoding the attribute information of the points in the point cloud, for the points at the high positions in the decoding order, which are important in the prediction, the quantization step sizes thereof will not be very large, and the large reconstruction error can be avoided, that is, the point with a high quantization weight can be quantized with a smaller quantization step size to reduce the reconstruction error. For the points at the lower positions in the decoding order, the prediction accuracy and decoding effect can be improved.

In some embodiments of the disclosure, the decoder can perform LOD partition on the point cloud according to the geometry information of the points in the point cloud, to obtain multiple LOD layers of the point cloud, each LOD layer including one or more points. The preset interval may include a first preset interval and a second preset interval, and the index range of the first point includes a first index range and a second index range. Then, the decoder can obtain the first index range of the first point by partitioning (such as equal interval partition) at least one point in first M LOD layers in the multiple LOD layers according to the first preset interval, and obtain the second index range of the first point by partitioning (such as equal interval partition) at least one point in remaining LOD layers in the multiple LOD layers according to the second preset interval, where M is a positive integer and is less than a total number of layers of the multiple LOD layers, and the first preset interval is less than the second preset interval.

In some embodiments of the disclosure, when the decoder is decoding the current point, the current point is a point in any one of the multiple LOD layers. Moreover, the decoder parses the bitstream to determine the number of points in the point cloud whose indexes belong to the index range of the first point. After obtaining the number of points belonging to the first point in the point cloud, the decoder can find, according to the preset interval, the points required to be losslessly encoded. The number of points includes the number of points in each LOD layer belonging to the first point. That is, the bitstream carries the specific number (num) of points at equal intervals in each LOD layer for which lossless encoding is performed on the residual value of the attribute information, that is, num is carried in the attribute bitstream. Thus, the decoder can determine from each LOD layer the corresponding number of points on which losses encoding is performed in that layer. This is consistent with the partition manner of encoder during encoding.

In practical application, the decoder performs lossless decoding on the residual information of the attribute information of the current point as follows, that is, the decoder does not perform inverse quantization on the residual information of the attribute information of the current point to-be-decoded as follows.

Manner 1, the current point to-be-decoded is skipped in the process of inversely quantizing the residual information of the attribute information of the points in the point cloud.

Manner 2, the inverse quantization step size of the current point to-be-decoded is set to 1.

Manner 3, the quantization parameter QP of the current point to-be-decoded is set as a target value, and the target value is the QP value corresponding to the inverse quantization step size of 1.

In embodiments of the disclosure, when the current point belongs to the first point, taking the current point to-be-decoded in the point cloud as an example, if it is determined that the encoding end performs lossless encoding on the residual value of the attribute information of the current point, the decoding end determines to perform lossless decoding on the residual information of the attribute information of the current point. That is, the following formula (15) is adopted to determine the reconstructed value of the attribute information of the point to-be-decoded:

$$reconstructedColor = attrResidual + attrPredValue \qquad (15),$$

where $reconstructedColor$ is the reconstructed value of the attribute information of the current point, also referred to as the reconstructed value of the color attribute information of the current point, $attrPredValue$ is the prediction value of the attribute information of the current point, and $attrResidual$ is the residual information or the residual value of the attribute information of the current point.

It can be understood that, for the first M LOD layers which are more important, more points on which lossless decoding is performed are selected, while for the last several LOD layers which are less important, fewer points on which lossless decoding is performed are selected. As such, the accuracy of decoding information of important points can be effectively ensured, thereby improving the accuracy of the whole decoding.

Figure 9:
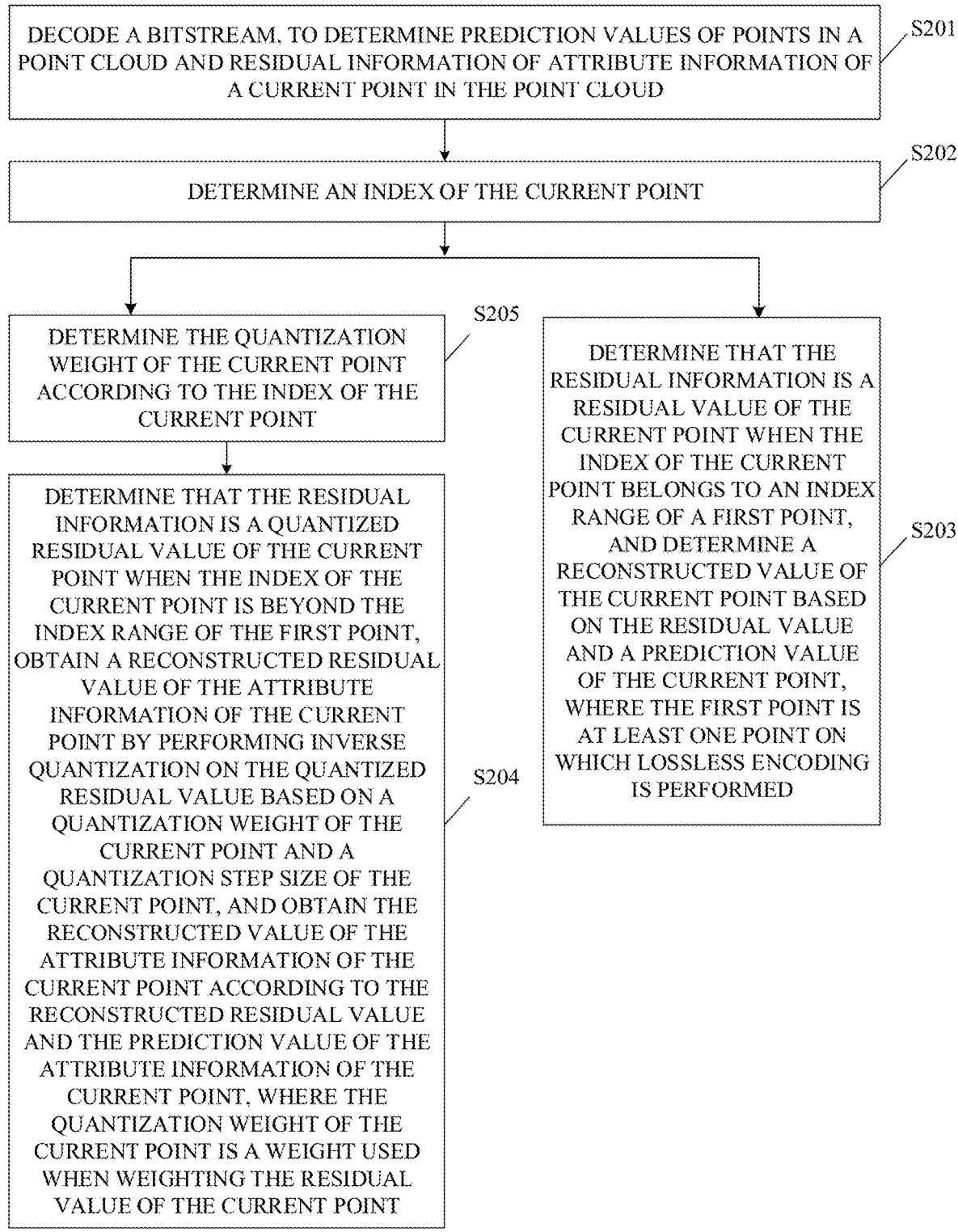
FIG. 9 is flow chart 2 of a point cloud decoding method provided in embodiments of the disclosure.

In some embodiments of the disclosure, based on FIG. 8, as illustrated in FIG. 9, a point cloud decoding method provided in embodiments of the disclosure further includes S205. Refer to the following.

S205, the quantization weight of the current point is determined according to the index of the current point.

In embodiments of the disclosure, the decoder may obtain quantization weights of the points based on indexes of the points.

In embodiments of the disclosure, the quantization weights of the point cloud are stored as an array, and the dimension of the array is the same as the number of the points in the point cloud. For example, QuantWeight [index] represents the quantization weight of the index of the point equal to index. In this case, QuantWeight [ ] can be understood as an array that stores the quantization weights of all points in the point cloud. The dimension of the array is consistent with the number of the points in the point cloud, and the quantization weight of the point can be found through the index of the point.

In some embodiments of the disclosure, the decoder partitions the point cloud into one or more LOD layers, each LOD layer including one or more points. Initial values of quantization weights of points in first M LOD layers in the multiple LOD layers are greater than initial values of quantization weights of points in remaining LOD layers other than the first M LOD layers in the multiple LOD layers. M is an integer greater than 0. For example, the initial value of the quantization weight of each point in the first seven LOD layers is set to 512, and the initial value of the quantization weight of each point in the remaining LOD layers is set to 256.

In one implementation, the decoder may traverse points in the point cloud in a reverse order of a decoding order of the point cloud and update quantization weights of N nearest neighbouring points of the current point based on quantization weight of the current point, where N is an integer greater than 0. For example, for the current point, the quantization weight of each of the N nearest neighbouring points of the current point is updated based on the quantization weight of the current point, where N is an integer greater than 0. In one implementation, an influence weight of the current point on each of the N nearest neighbouring points is obtained, where the influence weight depends on position information of the current point and the N nearest neighbouring points. The quantization weights of the N nearest neighbouring points are updated based on the quantization weight of the current point and the influence weight of the current point on each of the N nearest neighbouring points. In one implementation, an attribute parameter set of the point cloud includes the influence weight of the current point on each of the N nearest neighbouring points. By querying the attribute parameter set, the influence weight of the current point on each of the N nearest neighbouring points is obtained. That is, the influence weight of the current point on each of the N nearest neighbouring points is obtained according to the attribute parameter set of the point cloud, where the attribute parameter set of the point cloud includes a preset influence weight of the current point on each of N nearest neighbouring points.

It should be noted that the initial value of the quantization weight of each point in the point cloud is a preset value.

It should be noted that, in embodiments of the disclosure, the specific value of the initial value is not limited. As an example, the initial value may be 256, 512, or other specific values. Initializing to 256 is to set the quantization weights of all points in the point cloud to 256.

In embodiments of the disclosure, after the decoder traverses each point in the point cloud in the reverse order, the quantization weight of each point is updated according to its importance in the process of predicting the attribute information of the points in the point cloud, and the more important the point, the larger the quantization weight. That is, the influence weight of the current point on each of the N nearest neighbouring points decreases as a distance between the current point and each of the nearest neighbouring points increases.

In one embodiment mode, the quantization weight of the current point is multiplied by the influence weight of the current point on each of the N nearest neighbouring points, the quantization weight of the current point after the multiplying is right-shifted by a second preset bit, and then the quantization weight of the current point after the right shifting is added with the quantization weight before updating of each nearest neighbouring point, to update the quantization weights of the N nearest neighbouring points.

In some embodiments of the disclosure, when the current point does not belong to the first point, the decoder inversely quantizes the quantized residual value based on the quantization weight of the current point and the quantization step size of the current point to obtain the reconstructed residual value of the attribute information of the current point as follows. The decoder determines an effective quantization weight of the current point based on the quantization weight of the current point, and inversely quantizes the quantized residual value with the effective quantization weight of the current point and the quantization step size of the current point to obtain the reconstructed residual value.

In some embodiments of the disclosure, the decoder compares the quantization weight of the current point with the quantization step size of the current point to determine a first minimum value, and determines the first minimum value as the effective quantization weight of the current point.

In some embodiments of the disclosure, the decoder compares the quantization weight of the current point after right shifting by a first preset bit with the quantization step size of the current point, to determine a second minimum value, and determines the second minimum value as the effective quantization weight of the current point.

In some embodiments of the disclosure, the value of the effective quantization weight is equal to an integer power of 2.

In some embodiments of the disclosure, the value of the quantization weight of the current point is not equal to an integer power of 2, and an integer power of 2 closest to the quantization weight of the current point is determined as the effective quantization weight based on the value of the quantization weight of the current point.

In embodiments of the disclosure, by constructing the value of the effective quantization weight as an integer power of 2, the weighted multiplication operation can be processed as the shift operation, which can improve the processing efficiency of the decoder and further improve the performance of the decoder.

It should be noted that in other alternative embodiments of the disclosure, the minimum value can be taken from the quantization weight of the current point and the quantization step size of the current point, and then an integer power of 2 closest to the minimum value is determined as the effective quantization weight. The effective quantification weight may also be determined in other ways and embodiments of the disclosure are not specifically limited thereto. For example, the quantization weight of the current point can be directly determined as the effective quantization weight of the current point.

In some embodiments of the disclosure, the decoder obtains a weighted residual value by performing inverse quantization on the quantized residual value with the quantization step size of the current point, and obtains the reconstructed residual value by dividing the weighted residual value by the effective quantization weight.

The decoder first calculates the quantization weight of each point in the point cloud according to the reconstructed position information, and determines the effective quantization weight of each point by comparing with the quantization step size. Then, the decoder decodes the bitstream to obtain the quantized residual value of the current point, inversely quantizes the quantized residual value to obtain the weighted residual value, and divides the weighted residual value by the effective quantization weight to obtain the residual value. The decoder performs the predicting transform to determine the prediction value of the attribute information of the current point, and then obtains the reconstructed value of the attribute information of the current point based on the prediction value of the attribute information of the current point and the residual value. After obtaining the reconstructed value of the attribute information of the current point, the decoder traverses the next point in order, for decoding and reconstruction.

After inverse quantization, the decoder divides the weighted residual value after inverse quantization by the effective quantization weight to remove the weighting influence, to obtain the residual value. It should be noted that since quantization is not lossless, the weighted residual value obtained by the decoder is not necessarily equal to the weighted residual value obtained by the encoder.

Exemplarily, in some embodiments of the disclosure, the quantized residual value is inversely quantized by using the following formula (16) to obtain the reconstructed residual value:

$$\text{attrResidualQuant1} = (\text{attrResidualQuant2} \times \text{Qstep}) / \text{effectiveQuantWeight} \qquad (16),$$

where attrResidualQuant2 represents the quantized residual value, attrResidualQuant1 represents the reconstructed residual value, effectiveQuantWeight represents the effective quantization weight of the current point, and Qstep represents the quantization step size of the current point.

It should be noted that the implementation principle of decoder and encoder is consistent, which will not be repeated herein.

It can be understood that, when decoding the current point, the decoder performs lossless decoding (i.e., no inverse quantization) on the residual value of the attribute information of the at least one point in the point cloud, to reduce the influence of quantization on the reconstructed value of the attribute information, and further improve the prediction accuracy of the attribute information. Furthermore, the quantization weights of the points other than the at least one point on which lossless decoding is performed are introduced, and the residual values of the points other than the at least one point on which lossless decoding is performed are adaptively quantized inversely with different quantization weights of the points other than the at least one point on which lossless decoding is performed. In the process of predicting the attribute information of the points in the point cloud, for the points at the high positions in the decoding order, which are important in the prediction, the quantization step sizes thereof will not be very large, and the large reconstruction error can be avoided, that is, the point with a high quantization weight can be quantized with a smaller quantization step size to reduce the reconstruction error. For the points at the lower positions in the decoding order, the prediction accuracy can be improved.

It should be noted that after the technical solutions of the disclosure are implemented on the G-PCC reference software TMC13 V12.0, part of the point cloud test series (cat1-A) required by the MPEG is tested under the test condition of the general test configuration CTC CY, and the test results are illustrated in Tables 1-2.

TABLE 1

| | End to end BD-AttrRate [%] | | |
|---|---|---|---|
| Point cloud series | luma component | chroma component | chroma component |
| Cat1-A basketball_player_vox11_0000020 | −4.0% | −8.4% | −16.1% |
| boxer_viewdep_vox12 | −1.5% | −12.5% | −16.6% |
| dancer_vox11_00000001 | −0.9% | −4.4% | −11.4% |
| egyptian_mask_vox12 | −1.0% | −13.6% | −1.4% |
| facade_00009_vox12 | 0.1% | −0.6% | −0.3% |
| facade_00015_vox14 | 0.0% | −1.1% | −1.2% |
| facade_00064_vox11 | −0.2% | −2.8% | −6.1% |
| frog_00067_vox12 | −0.4% | −3.6% | −4.3% |
| head_00039_vox12 | −0.1% | −0.7% | −4.1% |
| house_without_roof_00057_vox12 | −1.0% | −2.8% | −4.9% |
| longdress_viewdep_vox12 | 0.2% | −1.0% | −0.2% |
| longdress-vox10_1300 | 0.1% | −0.1% | −0.1% |
| loot_viewdep_vox12 | −3.5% | −12.8% | −23.9% |
| loot_vox10_1200 | −1.5% | −5.0% | −10.4% |
| queen_0200 | −0.6% | −6.1% | −5.2% |
| redandblack_viewdep_vox12 | −2.2% | −5.7% | −3.3% |
| redandblack_vox10_1550 | −1.2% | −3.2% | −1.9% |
| shiva_00035_vox12 | 0.1% | 0.0% | 0.0% |

TABLE 1-continued

| | End to end BD-AttrRate [%] | | |
|---|---|---|---|
| Point cloud series | luma component | chroma component | chroma component |
| soldier_viewdep_vox12 | 0.2% | −4.7% | −8.9% |
| soldier_vox10_0690 | 0.0% | −1.6% | −5.2% |
| thaidancer_viewdep_vox12 | −1.5% | −4.6% | −2.2% |
| ulb_unicorn_vox13 | −1.7% | −6.6% | −3.9% |

It can be seen from Table 1 that the points in cat1-A point cloud series include color attribute information and other attribute information, such as reflectance attribute information. BD-AttrRate is one of the main parameters to evaluate the performance of video encoding algorithm, which indicates the change in bit rate and peak signal to noise ratio (PSNR) of the video encoded by the new algorithm (i.e., the technical solution of the disclosure) relative to the original algorithm, that is, the change in bit rate between the new algorithm and the original algorithm under the same signal-to-noise ratio. "−" indicates performance improvement, such as bit rate and PSNR performance improvements. As illustrated in Table 1, for cat1-A point cloud series, compared with the original technology, the technical solution of the disclosure has performance improvements in luma component (Luma), chroma component (Cb) and chroma component (Cr).

TABLE 2

| | End to end BD-AttrRate [%] | | |
|---|---|---|---|
| Point cloud series | Luma component (Luma) | Chroma component (Cb) | Chroma component (Cr) |
| Cat1-A average (the disclosure) | −4.8% | −11.0% | −11.9% |
| Cat1-A average (partial lossless compression) | −0.9% | −4.6% | −6.0% |

As can be seen from Table 2, for cat1-A point cloud series, compared with the technology of merely adopting partial lossless compression, in the technical solution of the disclosure, the average of luma component (Luma) is increased by 3.9%, the average of chroma component Cb is increased by 6.4%, and the average of chroma component Cr is increased by 5.9%.

Figure 10:
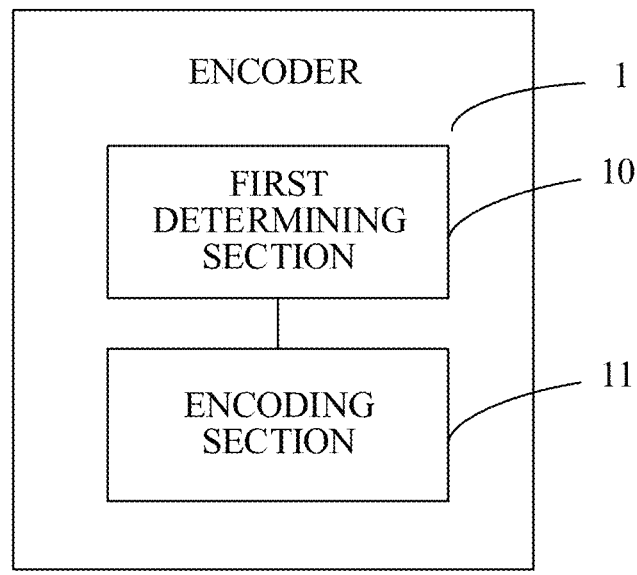
FIG. 10 is structural diagram 1 of an encoder provided in embodiments of the disclosure.

Based on the implementation basis of the foregoing embodiments, as illustrated in FIG. 10, embodiments of the disclosure provide an encoder 1. The encoder 1 includes a first determining section 10 and an encoding section 11.

The first determining section 10 is configured to: determine a residual value of attribute information of a current point in a point cloud according to a prediction value of the attribute information of the current point, and determine an index of the current point. The encoding section 11 is configured to: perform lossless encoding on the residual value of the attribute information of the current point, when the index of the current point belongs to an index range of a first point, where the first point is at least one point on which lossless encoding is performed, and obtain a quantized residual value of the attribute information of the current point by quantizing the residual value of the attribute information of the current point based on a quantization weight of the current point and a quantization step size of the current point, when the index of the current point is beyond the index range of the first point, and encode the quantized residual value, where the quantization weight of the current point is a weight used when weighting the residual value of the current point.

In some embodiments of the disclosure, the encoder 1 further includes a first partition section 12 (not illustrated in the figure). The first partition section 12 is further configured to: determine the index range of the first point by partitioning points in the point cloud according to a preset interval.

In some embodiments of the disclosure, the first partition section 12 is further configured to: obtain a plurality of LOD layers of the point cloud by performing LOD partition on the point cloud according to geometry information of the points in the point cloud, where each LOD layer includes one or more points.

In some embodiments of the disclosure, the preset interval includes: a first preset interval and a second preset interval, and the index range of the first point includes a first index range and a second index range. The first partition section 12 is further configured to: obtain the first index range of the first point by partitioning at least one point in first M LOD layers in the plurality of LOD layers according to the first preset interval; and obtain the second index range of the first point by partitioning at least one point in remaining LOD layers in the plurality of LOD layers according to the second preset interval, where M is a positive integer and is less than a total number of layers of the plurality of LOD layers, and the first preset interval is less than the second preset interval.

In some embodiments of the disclosure, the current point is a point in any one of the plurality of LOD layers.

In some embodiments of the disclosure, the encoder 1 further includes a first obtaining section 13 and a signalling section 14 (not illustrated in the figure). The first obtaining section 13 is configured to obtain the number of points in the point cloud, where each of the points has an index belonging to the index range of the first point. The signalling section 14 is configured to signal the number of points into a bitstream.

In some embodiments of the disclosure, the first obtaining section 13 is configured to obtain the number of points in each LOD layer each of which has an index belonging to the index range of the first point.

In some embodiments of the disclosure, the encoding section 11 is further configured to: skip quantizing the residual value of the attribute information of the current point; or set the quantization step size of the current point to 1; or set a quantization parameter (QP) of the current point to a target value, where the target value is a QP value corresponding to the quantization step size of 1.

In some embodiments of the disclosure, the first determining section 10 is further configured to determine the quantization weight of the current point according to the index of the current point.

In some embodiments of the disclosure, the encoding section 11 is further configured to: determine an effective quantization weight of the current point based on the quantization weight of the current point; and obtain the quantized residual value by quantizing the residual value with the effective quantization weight of the current point and the quantization step size of the current point.

In some embodiments of the disclosure, the encoding section 11 is further configured to: compare the quantization weight of the current point with the quantization step size of the current point, to determine a first minimum value; and determine the first minimum value as the effective quantization weight of the current point.

In some embodiments of the disclosure, the encoding section 11 is further configured to: compare the quantization weight of the current point after right shifting by a first preset bit with the quantization step size of the current point, to determine a second minimum value; and determine the second minimum value as the effective quantization weight of the current point.

In some embodiments of the disclosure, the encoding section 11 is further configured to: obtain a weighted residual value by multiplying the effective quantization weight by the residual value; and obtain the quantized residual value by quantizing the weighted residual value with the quantization step size of the current point.

In some embodiments of the disclosure, the encoder 1 further includes a first updating section 15 (not illustrated in the figure). The first updating section 15 is configured to: traverse points in the point cloud in a reverse order of an encoding order of the point cloud, and update quantization weights of N nearest neighbouring points of the current point based on the quantization weight of the current point, where N is an integer greater than 0, and initial values of quantization weights of the points in the point cloud are preset values.

In some embodiments of the disclosure, initial values of quantization weights of points in first M LOD layers in the plurality of LOD layers are greater than initial values of quantization weights of points in remaining LOD layers in the plurality of LOD layers other than the first M LOD layers.

In some embodiments of the disclosure, the first updating section 15 is configured to: obtain an influence weight of the current point on each of the N nearest neighbouring points, where the influence weight depends on position information of the current point and the N nearest neighbouring points; and update the quantization weights of the N nearest neighbouring points based on the quantization weight of the current point and the influence weight of the current point on each of the N nearest neighbouring points.

In some embodiments of the disclosure, the first updating section 15 is configured to: determine the influence weight of the current point on each of the N nearest neighbouring points according to an attribute parameter set of the point cloud, where the attribute parameter set of the point cloud includes a preset influence weight of the current point on each of the N nearest neighbouring points.

In some embodiments of the disclosure, the first updating section 15 is configured to: multiply the quantization weight of the current point by the influence weight of the current point on each of the N nearest neighbouring points, right shift the quantization weight of the current point after the multiplying by a second preset bit, and then add the quantization weight of the current point after the right shifting with the quantization weight before updating of each nearest neighbouring point, to update the quantization weights of the N nearest neighbouring points.

In some embodiments of the disclosure, the influence weight of the current point on each of the N nearest neighbouring points decreases as a distance between the current point and each of the nearest neighbouring points increases.

In some embodiments of the disclosure, quantization weights of points in the point cloud are stored as an array, and the dimension of the array is the same as the number of the points in the point cloud.

In some embodiments of the disclosure, the first determining section 10 is further configured to: determine reconstructed information of geometry information of the current point in the point cloud by processing the geometry information of the current point in the point cloud; determine the prediction value of the attribute information of the current point according to the reconstructed information of the geometry information of the current point; determine an actual value of the attribute information of the current point by processing the attribute information of the current point; and determine the residual value of the current point according to the prediction value of the attribute information of the current point and the actual value of the attribute information of the current point.

It can be understood that, when encoding the current point, the encoder performs lossless encoding (i.e., no quantization) on the residual value of the attribute information of the at least one point in the point cloud, to reduce the influence of quantization on the reconstructed value of the attribute information, and further improve the prediction accuracy of the attribute information. Furthermore, the quantization weights of the points other than the at least one point on which lossless encoding is performed are introduced, and the residual values of the points other than the at least one point on which lossless encoding is performed are adaptively quantized with different quantization weights of the points other than the at least one point on which lossless encoding is performed. In the process of predicting the attribute information of the points in the point cloud, for the points at the high positions in the encoding order, which are important in the prediction, the quantization step sizes thereof will not be very large, and the large reconstruction error can be avoided, that is, the point with a high quantization weight can be quantized with a smaller quantization step size to reduce the reconstruction error. For the points at the lower positions in the encoding order, the prediction accuracy can be improved.

Figure 11:
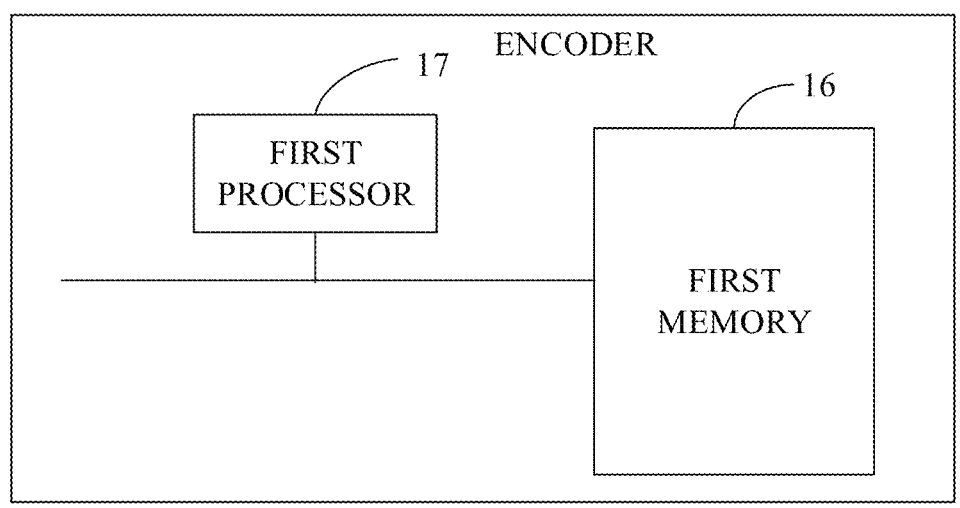
FIG. 11 is structural diagram 2 of an encoder provided in embodiments of the disclosure.

In practical application, as illustrated in FIG. 11, embodiments of the disclosure further provide an encoder. The encoder includes a first memory 16 and a first processor 17.

The first memory 16 is configured to store executable point cloud encoding instructions. The first processor 17 is configured to execute the executable point cloud encoding instructions stored in the first memory to implement the point encoding method.

The first processor 17 may be implemented by software, hardware, firmware, or a combination thereof, by using circuitry, single or multiple application specific integrated circuits (ASIC), single or multiple general purpose integrated circuits, single or multiple microprocessors, single or multiple programmable logic devices, or combinations of the aforementioned circuitry or devices, or other suitable circuitry or devices, so that the first processor 17 may perform corresponding steps of the point cloud encoding method in the aforementioned embodiments.

The components in embodiments of the disclosure may be integrated in one processing unit, each unit may exist physically alone, or two or more units may be integrated in one unit. The integrated unit can be realized either in the form of hardware or in the form of software function module.

The integrated unit, if implemented in the form of a software functional module and not sold or used as a stand-alone product, may be stored in a computer-readable storage medium. Based on this understanding, the technical solution of the embodiment, in essence or in part contributing to the prior art or in whole or in part, may be embodied in the form of a software product. The computer software product is stored in a storage medium, and includes instructions for causing a computer device (which may be a personal computer, server, or network device, etc.) or processor, to perform all or part of the steps of the method of the embodiment. The aforementioned storage medium includes: ferromagnetic random access memory (FRAM), read-only memory (ROM), programmable read-only memory (PROM), erasable programmable read-only memory (EPROM), electrically erasable programmable read-only memory (EEPROM), flash memory, magnetic surface memory, optical disc, or compact disc read-only memory (CD-ROM) and other media capable of storing program codes, which are not limited in the implementations of the disclosure.

Embodiments of the disclosure further provide a computer-readable storage medium. The computer-readable storage medium stores executable point cloud encoding instructions. When executed by a first processor, the executable point cloud encoding instructions implement the point cloud encoding method provided in embodiments of the disclosure.

Figure 12:
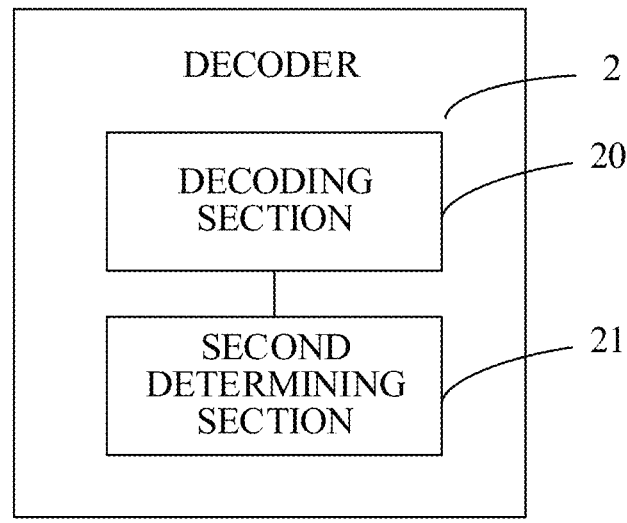
FIG. 12 is structural diagram 1 of a decoder provided in embodiments of the disclosure.

Based on the implementation basis of the foregoing embodiments, as illustrated in FIG. 12, embodiments of the disclosure provide a decoder 2. The decoder 2 includes a decoding section 20 and a second determining section 21.

The decoding section 20 is configured to: decode a bitstream, to determine prediction values of points in a point cloud and residual information of attribute information of a current point in the point cloud. The second determining section 21 is configured to: determine an index of the current point, determine that the residual information is a residual value of the current point when the index of the current point belongs to an index range of a first point, and determine a reconstructed value of the current point based on the residual value and a prediction value of the current point, where the first point is at least one point on which lossless encoding is performed, and determine that the residual information is a quantized residual value of the current point when the index of the current point is beyond the index range of the first point, obtain a reconstructed residual value of the attribute information of the current point by performing inverse quantization on the quantized residual value based on a quantization weight of the current point and a quantization step size of the current point, and obtain the reconstructed value of the attribute information of the current point according to the reconstructed residual value and the prediction value of the attribute information of the current point, where the quantization weight of the current point is a weight used when weighting the residual value of the current point.

In some embodiments of the disclosure, the decoding section 20 is further configured to: decode the bitstream, to determine geometry information of the points in the point cloud and the residual information of the attribute information of the current point in the point cloud; and determine the prediction value of the attribute information of the current point in the point cloud according to the geometry information of the points in the point cloud.

In some embodiments of the disclosure, the decoder 2 further includes a second partition section 22 (not illustrated in the figure). The second partition section 22 is further configured to: determine the index range of the first point by partitioning the points in the point cloud according to a preset interval.

In some embodiments of the disclosure, the second partition section 22 is further configured to: obtain a plurality of LOD layers of the point cloud by performing LOD partition on the point cloud according to geometry information of the points in the point cloud, where each LOD layer includes one or more points.

In some embodiments of the disclosure, the preset interval includes: a first preset interval and a second preset interval, and the index range of the first point includes a first index range and a second index range. The second partition section 22 is further configured to: obtain the first index range of the first point by partitioning at least one point in first M LOD layers in the plurality of LOD layers according to the first preset interval; and obtain the second index range of the first point by partitioning at least one point in remaining LOD layers in the plurality of LOD layers according to the second preset interval, where M is a positive integer and is less than a total number of layers of the plurality of LOD layers, and the first preset interval is less than the second preset interval.

In some embodiments of the disclosure, the current point is a point in any one of the plurality of LOD layers.

In some embodiments of the disclosure, the decoding section 20 is further configured to: decode the bitstream, to determine the number of points in the point cloud each of which has an index belonging to the index range of the first point, where the number of points is used for partitioning the index range of the first point.

In some embodiments of the disclosure, the number of points includes the number of points in each LOD layer each of which has an index belonging to the index range of the first point.

In some embodiments of the disclosure, the second determining section 21 is further configured to: determine the quantization weight of the current point according to the index of the current point.

In some embodiments of the disclosure, the second determining section 21 is further configured to: determine an effective quantization weight of the current point based on the quantization weight of the current point; and obtain the reconstructed residual value by performing inverse quantization on the quantized residual value with the effective quantization weight of the current point and the quantization step size of the current point.

In some embodiments of the disclosure, the second determining section 21 is further configured to: compare the quantization weight of the current point with the quantization step size of the current point, to determine a first minimum value; and determine the first minimum value as the effective quantization weight of the current point.

In some embodiments of the disclosure, the second determining section 21 is further configured to: compare the quantization weight of the current point after right shifting by a first preset bit with the quantization step size of the current point, to determine a second minimum value; and determine the second minimum value as the effective quantization weight of the current point.

In some embodiments of the disclosure, the second determining section 21 is further configured to: obtain a weighted residual value by performing inverse quantization on the quantized residual value with the quantization step size of the current point; and obtain the reconstructed residual value by dividing the weighted residual value by the effective quantization weight.

In some embodiments of the disclosure, the decoder 2 further includes a second updating section 23 (not illustrated in the figure). The second updating section 23 is further configured to: traverse the points in the point cloud in a reverse order of an encoding order of the point cloud, and update quantization weights of N nearest neighbouring points of the current point based on the quantization weight of the current point, where N is an integer greater than 0, and initial values of quantization weights of the points in the point cloud are preset values.

In some embodiments of the disclosure, initial values of quantization weights of points in first M LOD layers in the plurality of LOD layers are greater than initial values of quantization weights of points in remaining LOD layers in the plurality of LOD layers other than the first M LOD layers.

In some embodiments of the disclosure, the second updating section 23 is further configured to: obtain an influence weight of the current point on each of the N nearest neighbouring points, where the influence weight depends on position information of the current point and the N nearest neighbouring points; and update the quantization weights of the N nearest neighbouring points based on the quantization weight of the current point and the influence weight of the current point on each of the N nearest neighbouring points.

In some embodiments of the disclosure, the second updating section 23 is further configured to: obtain the influence weight of the current point on each of the N nearest neighbouring points according to an attribute parameter set of the point cloud, where the attribute parameter set of the point cloud includes a preset influence weight of the current point on each of the N nearest neighbouring points.

In some embodiments of the disclosure, the second updating section 23 is further configured to: multiply the quantization weight of the current point by the influence weight of the current point on each of the N nearest neighbouring points, right shift the quantization weight of the current point after the multiplying by a second preset bit, and then add the quantization weight of the current point after the right shifting with the quantization weight before updating of each nearest neighbouring point, to update the quantization weights of the N nearest neighbouring points.

In some embodiments of the disclosure, the influence weight of the current point on each of the N nearest neighbouring points decreases as a distance between the current point and each of the nearest neighbouring points increases.

In some embodiments of the disclosure, quantization weights of the points in the point cloud are stored as an array, and the dimension of the array is the same as the number of the points in the point cloud.

It can be understood that, when decoding the current point, the decoder performs lossless decoding (i.e., no inverse quantization) on the residual value of the attribute information of the at least one point in the point cloud, to reduce the influence of quantization on the reconstructed value of the attribute information, and further improve the prediction accuracy of the attribute information. Furthermore, the quantization weights of the points other than the at least one point on which lossless decoding is performed are introduced, and the residual values of the points other than the at least one point on which lossless decoding is performed are adaptively quantized inversely with different quantization weights of the points other than the at least one point on which lossless decoding is performed. In the process of predicting the attribute information of the points in the point cloud, for the points at the high positions in the decoding order, which are important in the prediction, the quantization step sizes thereof will not be very large, and the large reconstruction error can be avoided, that is, the point with a high quantization weight can be quantized with a smaller quantization step size to reduce the reconstruction error. For the points at the lower positions in the decoding order, the prediction accuracy can be improved.

Figure 13:
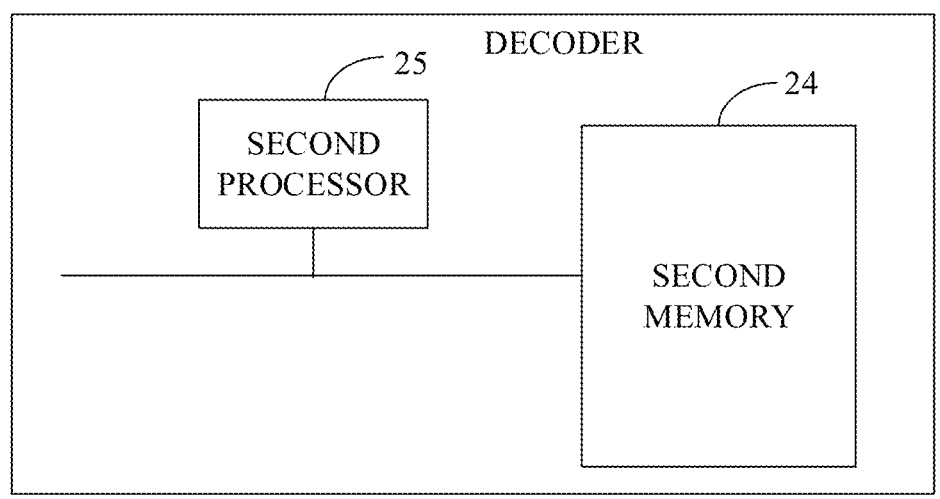
FIG. 13 is structural diagram 2 of a decoder provided in embodiments of the disclosure.

In practical application, as illustrated in FIG. 13, implementations of the disclosure further provide a decoder. The decoder includes a second memory 24 and a second processor 25.

The second memory 24 is configured to store at least one computer executable instruction such as executable point cloud decoding instructions. The second processor 25 is configured to execute the executable point cloud decoding instructions stored in the second memory 24 to implement the method provided in embodiments of the disclosure.

Embodiments of the disclosure further provide a computer-readable storage medium. The computer-readable storage medium stores executable point cloud decoding instructions. When executed by a second processor, the executable point cloud decoding instructions implement the point cloud decoding method provided in embodiments of the disclosure.

A person of ordinary skill in the art may be aware that, the units and process steps of the examples described with reference to the embodiments disclosed in the disclosure can be implemented in electronic hardware, or a combination of computer software and electronic hardware. Whether the functions are executed by hardware or software depends on particular applications and design constraint conditions of the technical solutions. A person skilled in the art may use different methods to implement the described functions for each particular application, but it should not be considered that the embodiment goes beyond the scope of the disclosure.

Finally, the contents are merely embodiments of the disclosure, but are not intended to limit the protection scope of the disclosure. Any variation or substitution readily figured out by a person skilled in the art within the technical scope disclosed in the disclosure shall fall within the protection scope of the disclosure. Therefore, the protection scope of the disclosure shall be subject to the protection scope of the claims.

INDUSTRIAL APPLICABILITY

Embodiments of the disclosure provide a point cloud encoding and decoding method, an encoder, a decoder, and a computer-readable storage medium. When encoding the current point, lossless encoding (i.e., no quantization) is performed on the residual value of the attribute information of the at least one point in the point cloud, to reduce the influence of quantization on the reconstructed value of the attribute information, and further improve the prediction accuracy of the attribute information. Furthermore, the quantization weights of the points other than the at least one point on which lossless encoding is performed are introduced, and the residual values of the points other than the at least one point on which lossless encoding is performed are adaptively quantized with different quantization weights of the points other than the at least one point on which lossless encoding is performed. In the process of predicting the attribute information of the points in the point cloud, for the points at the high positions in the encoding order, which are important in the prediction, the quantization step sizes thereof will not be very large, and the large reconstruction error can be avoided, that is, the point with a high quantization weight can be quantized with a smaller quantization step size to reduce the reconstruction error. For the points at the lower positions in the encoding order, the prediction accuracy can be improved.

What is claimed is:

1. A point cloud encoding method, comprising:
determining a residual value of attribute information of a current point in a point cloud according to a prediction value of the attribute information of the current point;
determining an index of the current point;
performing lossless encoding on the residual value of the attribute information of the current point, when the index of the current point belongs to an index range of a first point, the first point being at least one point on which lossless encoding is performed; and
obtaining a quantized residual value of the attribute information of the current point by quantizing the residual value of the attribute information of the current point based on a quantization weight of the current point and a quantization step size of the current point, when the index of the current point is beyond the index range of the first point, and encoding the quantized residual value, the quantization weight of the current point being a weight used when weighting the residual value of the current point.

2. The method of claim 1, further comprising:
determining the index range of the first point by partitioning points in the point cloud according to a preset interval.

3. The method of claim 2, further comprising:
obtaining a plurality of level of detail (LOD) layers of the point cloud by performing LOD partition on the point cloud according to geometry information of the points in the point cloud, wherein each LOD layer comprises one or more points.

4. The method of claim 3, wherein:
the preset interval comprises: a first preset interval and a second preset interval, and the index range of the first point comprises a first index range and a second index range; and
determining the index range of the first point by partitioning the points in the point cloud according to the preset interval comprises:
obtaining the first index range of the first point by partitioning at least one point in first M LOD layers in the plurality of LOD layers according to the first preset interval; and
obtaining the second index range of the first point by partitioning at least one point in remaining LOD layers in the plurality of LOD layers according to the second preset interval, wherein M is a positive integer and is less than a total number of layers of the plurality of LOD layers, and the first preset interval is less than the second preset interval.

5. The method of claim 3, wherein the current point is a point in any one of the plurality of LOD layers.

6. The method of claim 1, further comprising:
obtaining a number of points in the point cloud each of which has an index belonging to the index range of the first point; and
signalling the number of points into a bitstream.

7. A point cloud decoding method, comprising:
decoding a bitstream, to determine prediction values of points in a point cloud and residual information of attribute information of a current point in the point cloud;
determining an index of the current point;
determining that the residual information is a residual value of the current point when the index of the current point belongs to an index range of a first point, and determining a reconstructed value of the current point based on the residual value and a prediction value of the current point, the first point being at least one point on which lossless encoding is performed; and
determining that the residual information is a quantized residual value of the current point when the index of the current point is beyond the index range of the first point, obtaining a reconstructed residual value of the attribute information of the current point by performing inverse quantization on the quantized residual value based on a quantization weight of the current point and a quantization step size of the current point, and obtaining the reconstructed value of the attribute information of the current point according to the reconstructed residual value and the prediction value of the attribute information of the current point, the quantization weight of the current point being a weight used when weighting the residual value of the current point.

8. The method of claim 7, wherein decoding the bitstream, to determine the prediction values of the points in the point cloud and the residual information of the attribute information of the current point in the point cloud comprises:
decoding the bitstream, to determine geometry information of the points in the point cloud and the residual information of the attribute information of the current point in the point cloud; and
determining the prediction value of the attribute information of the current point in the point cloud according to the geometry information of the points in the point cloud.

9. The method of claim 7, further comprising:
determining the index range of the first point by partitioning the points in the point cloud according to a preset interval.

10. The method of claim 9, further comprising:
obtaining a plurality of level of detail (LOD) layers of the point cloud by performing LOD partition on the point cloud according to geometry information of the points in the point cloud, wherein each LOD layer comprises one or more points.

11. The method of claim 10, wherein:
the preset interval comprises: a first preset interval and a second preset interval, and the index range of the first point comprises a first index range and a second index range; and
determining the index range of the first point by partitioning the points in the point cloud according to the preset interval comprises:
obtaining the first index range of the first point by partitioning at least one point in first M LOD layers in the plurality of LOD layers according to the first preset interval; and
obtaining the second index range of the first point by partitioning at least one point in remaining LOD layers in the plurality of LOD layers according to the second preset interval, wherein M is a positive integer and is less than a total number of layers of the plurality of LOD layers, and the first preset interval is less than the second preset interval.

12. The method of claim 10, wherein the current point is a point in any one of the plurality of LOD layers.

13. The method of claim 7, further comprising:
decoding the bitstream, to determine a number of points in the point cloud each of which has an index belonging to the index range of the first point, wherein the number of points is used for partitioning the index range of the first point.

14. The method of claim 13, wherein the number of points comprises the number of points in each LOD layer each of which has an index belonging to the index range of the first point.

15. The method of claim 7, further comprising:
determining the quantization weight of the current point according to the index of the current point.

16. The method of claim 7, wherein obtaining the reconstructed residual value of the attribute information of the current point by performing inverse quantization on the quantized residual value based on the quantization weight of the current point and the quantization step size of the current point comprises:
determining an effective quantization weight of the current point based on the quantization weight of the current point; and
obtaining the reconstructed residual value by performing inverse quantization on the quantized residual value with the effective quantization weight of the current point and the quantization step size of the current point.

17. The method of claim 16, wherein determining the effective quantization weight of the current point based on the quantization weight of the current point comprises:
comparing the quantization weight of the current point with the quantization step size of the current point, to determine a first minimum value; and
determining the first minimum value as the effective quantization weight of the current point.

18. The method of claim 16, wherein determining the effective quantization weight of the current point based on the quantization weight of the current point comprises:
comparing the quantization weight of the current point after right shifting by a first preset bit with the quantization step size of the current point, to determine a second minimum value; and
determining the second minimum value as the effective quantization weight of the current point.

19. The method of claim 16, wherein obtaining the reconstructed residual value by performing inverse quantization on the quantized residual value with the effective quantization weight of the current point and the quantization step size of the current point comprises:
obtaining a weighted residual value by performing inverse quantization on the quantized residual value with the quantization step size of the current point; and
obtaining the reconstructed residual value by dividing the weighted residual value by the effective quantization weight.

20. A decoder, comprising:
at least one processor; and
a memory coupled to the at least one processor and storing at least one computer executable instruction thereon which, when executed by the at least one processor, causes the at least one processor to:
decode a bitstream, to determine prediction values of points in a point cloud and residual information of attribute information of a current point in the point cloud; and
determine an index of the current point, determine that the residual information is a residual value of the current point when the index of the current point belongs to an index range of a first point, and determine a reconstructed value of the current point based on the residual value and a prediction value of the current point, the first point being at least one point on which lossless encoding is performed, and determine that the residual information is a quantized residual value of the current point when the index of the current point is beyond the index range of the first point, obtain a reconstructed residual value of the attribute information of the current point by performing inverse quantization on the quantized residual value based on a quantization weight of the current point and a quantization step size of the current point, and obtain the reconstructed value of the attribute information of the current point according to the reconstructed residual value and the prediction value of the attribute information of the current point, the quantization weight of the current point being a weight used when weighting the residual value of the current point.

* * * * *